United States Patent
Oliver et al.

(10) Patent No.: US 10,331,432 B2
(45) Date of Patent: Jun. 25, 2019

(54) PROVIDING AN IMPROVED WEB USER INTERFACE FRAMEWORK FOR BUILDING WEB APPLICATIONS

(71) Applicant: salesforce.com, inc., San Francisco, CA (US)

(72) Inventors: Gordon Oliver, San Francisco, CA (US); Freeland Knight Abbott, III, Athens, GA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 15/350,359

(22) Filed: Nov. 14, 2016

(65) Prior Publication Data

US 2017/0153883 A1    Jun. 1, 2017

Related U.S. Application Data

(63) Continuation of application No. 14/452,420, filed on Aug. 5, 2014, now Pat. No. 9,524,157.
(Continued)

(51) Int. Cl.
*G06F 9/44* (2006.01)
*G06F 8/65* (2018.01)
*H04L 29/08* (2006.01)

(52) U.S. Cl.
CPC .............. *G06F 8/65* (2013.01); *H04L 67/02* (2013.01); *H04L 67/10* (2013.01); *H04L 67/306* (2013.01)

(58) Field of Classification Search
None
See application file for complete search history.

(56) References Cited

U.S. PATENT DOCUMENTS 5,577,188 A   11/1996  Zhu
5,608,872 A    3/1997  Schwartz et al.
(Continued)

OTHER PUBLICATIONS

Villalobos, "Using Hierarchical Dependency Data Flows to Enable Dynamic Scalability on Parallel Patterns", 2011, Published by: 2011 IEEE International Parallel & Distributed Processing Symposium.*
(Continued)

*Primary Examiner* — Hossain M Morshed
(74) *Attorney, Agent, or Firm* — Weaver Austin Villeneuve & Sampson LLP

(57) ABSTRACT

Disclosed are methods, systems, and computer program products for updating a web application displayed on a client machine. In some implementations, a server maintains a database of application identifiers identifying instances of one or more web applications. The server receives, from a first client machine, a communication identifying a first web application and a first application identifier, the instance of the first web application being associated with one or more components. The server determines that the first application identifier is not included in the database of application identifiers, and generates an updated application identifier for the instance of the first web application based on component version identifiers of the one or more components. The server stores the updated application identifier and transmits a notification to the first client machine indicating that the instance of the first web application is out-of-date.

20 Claims, 11 Drawing Sheets

Related U.S. Application Data

(60) Provisional application No. 61/862,690, filed on Aug. 6, 2013.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,006,034 A * | 12/1999 | Heath .................. G06F 8/65 717/170 |
| 6,092,083 A | 7/2000 | Brodersen et al. |
| 6,141,010 A * | 10/2000 | Hoyle .................. G06F 8/60 715/201 |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,826,750 B1 * | 11/2004 | Curtis .................. G06F 9/44536 717/170 |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,417,823 B2 | 4/2013 | Luna et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,812,695 B2 | 8/2014 | Luna et al. |
| 8,839,209 B2 | 9/2014 | Gallagher et al. |
| 8,918,503 B2 | 12/2014 | Luna |
| 8,966,066 B2 | 2/2015 | Luna et al. |
| 9,009,250 B2 | 4/2015 | Luna |
| 9,021,048 B2 | 4/2015 | Luna et al. |
| 9,084,105 B2 | 7/2015 | Luna et al. |
| 9,426,249 B2 * | 8/2016 | Chasman ............ H04L 67/2857 |
| 9,524,157 B2 | 12/2016 | Oliver et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |

(56) References Cited

U.S. PATENT DOCUMENTS

| | | |
|---|---|---|
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0003390 A1* | 1/2004 | Canter ................ G06F 8/61 717/178 |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0204047 A1 | 9/2005 | Mitchell et al. |
| 2006/0036745 A1* | 2/2006 | Stienhans ............ G06F 8/38 709/228 |
| 2008/0215348 A1 | 9/2008 | Guldimann et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0088367 A1* | 4/2010 | Brown ................ G06F 8/60 709/203 |
| 2010/0100585 A1* | 4/2010 | Guney ............ G06F 16/9577 709/203 |
| 2010/0318892 A1* | 12/2010 | Teevan ............ G06F 17/2205 715/229 |
| 2011/0202905 A1* | 8/2011 | Mahajan .............. G06F 8/43 717/140 |
| 2011/0218958 A1 | 9/2011 | Warshaysky et al. |
| 2011/0247051 A1 | 10/2011 | Bulumulla et al. |
| 2011/0289140 A1* | 11/2011 | Pletter ............... G06F 3/0481 709/203 |
| 2012/0042218 A1 | 2/2012 | Cinarkaya et al. |
| 2012/0102420 A1 | 4/2012 | Fukahori |
| 2012/0233137 A1 | 9/2012 | Jakobson et al. |
| 2012/0290407 A1 | 11/2012 | Hubbard et al. |
| 2012/0331526 A1* | 12/2012 | Caudle .............. G06F 21/6209 726/4 |
| 2013/0054734 A1* | 2/2013 | Bond ................. G06F 9/4856 709/217 |
| 2013/0124595 A1* | 5/2013 | Oplinger ............. H04W 4/21 709/201 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0254755 A1* | 9/2013 | Yousouf ............. G06F 8/60 717/170 |
| 2013/0290531 A1* | 10/2013 | Azlin ............... H04L 67/16 709/225 |
| 2014/0109046 A1* | 4/2014 | Hirsch ............... G06F 9/44 717/120 |
| 2014/0136693 A1* | 5/2014 | Greifeneder ........ H04L 41/5067 709/224 |
| 2014/0189772 A1 | 7/2014 | Yamagishi et al. |
| 2014/0281473 A1* | 9/2014 | Simmons ............. G06F 1/24 713/100 |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0039682 A1 | 2/2015 | Chasman et al. |
| 2015/0039999 A1* | 2/2015 | Chasman ............. H04L 67/10 715/234 |
| 2015/0046915 A1* | 2/2015 | Oliver ............... G06F 8/65 717/170 |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2015/0304351 A1* | 10/2015 | Oberheide .......... H04L 63/1433 726/25 |

OTHER PUBLICATIONS

Raymand, "Refresh Webpage with Soft or Hard Reload in Web Browsers", 2012, https://www.raymond.cc/blog/refresh-webpage-with-soft-or-hard-reload-in-web-browsers/.*

Shoemate, "What happens when we hit refresh on a web page?", 2014, https://www.quora.com/What-happens-when-we-hit-refresh-on-a-web-page.*

U.S. Office Action dated Jul. 16, 2015 issued in U.S. Appl. No. 14/452,420.

U.S. Final Office Action dated Dec. 18, 2015 issued in U.S. Appl. No. 14/452,420.

U.S. Notice of Allowance dated Aug. 11, 2016 issued in U.S. Appl. No. 14/452,420.

U.S. Notice of Allowance dated Feb. 18, 2016 issued in U.S. Appl. No. 14/452,423.

U.S. Notice of Allowance dated Apr. 28, 2016 issued in U.S. Appl. No. 14/452,423.

U.S. Office Action dated Feb. 9, 2017 issued in U.S. Appl. No. 14/452,427.

"Google Plus Users", Google+Ripples, Oct. 31, 2011 [retrieved on Feb. 21, 2012 from Internet at http://www.googleplusers.com/google-ripples.html], 3 pages.

U.S. Final Office Action dated Aug. 23, 2017 issued in U.S. Appl. No. 14/452,427.

* cited by examiner

PROVIDING AN IMPROVED WEB USER INTERFACE FRAMEWORK FOR BUILDING WEB APPLICATIONS

PRIORITY DATA

This patent document claims priority to co-pending and commonly assigned U.S. patent application Ser. No. 14/452,420, titled "Providing an Improved Web User Interface Framework for Building Web Applications," by Oliver, et al., filed on Aug. 5, 2014, which claims priority to commonly assigned U.S. Provisional Patent Application No. 61/862,690, titled "Aura Universal IDs," by Oliver et al., filed on Aug. 6, 2013. The entire disclosures of U.S. patent application Ser. No. 14/452,420 and U.S. Provisional Patent Application No. 61/862,690 are hereby incorporated by reference for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This patent document relates generally to on-demand services provided over a data network such as the Internet, and more specifically to providing an improved web user interface framework for building web applications.

BACKGROUND

Organizations typically employ many different types of software and computing technologies to meet their computing needs. However, installing and maintaining software on an organization's own computer systems may involve one or more drawbacks. For example, when software must be installed on computer systems within the organization, the installation process often requires significant time commitments, since organization personnel may need to separately access each computer. Once installed, the maintenance of such software typically requires significant additional resources. Each installation of the software may need to be separately monitored, upgraded, and/or maintained. Further, organization personnel may need to protect each installed piece of software against viruses and other malevolent code. Given the difficulties in updating and maintaining software installed on many different computer systems, it is common for software to become outdated. Also, the organization will likely need to ensure that the various software programs installed on each computer system are compatible. Compatibility problems are compounded by frequent upgrading, which may result in different versions of the same software being used at different computer systems in the same organization.

Accordingly, organizations increasingly prefer to use on-demand services accessible via the Internet rather than software installed on in-house computer systems. On-demand services, often termed "cloud computing" services, take advantage of increased network speeds and decreased network latency to provide shared resources, software, and information to computers and other devices upon request. Cloud computing typically involves over-the-Internet provision of dynamically scalable and often virtualized resources. Technological details can be abstracted from the users, who no longer have need for expertise in, or control over, the technology infrastructure "in the cloud" that supports them.

BRIEF DESCRIPTION OF THE DRAWINGS

The included drawings are for illustrative purposes and serve only to provide examples of possible structures and operations for the disclosed inventive systems, apparatus, methods, and computer program products. These drawings in no way limit any changes in form and detail that may be made by one skilled in the art without departing from the spirit and scope of the disclosed implementations.

DETAILED DESCRIPTION

Figure 1A:
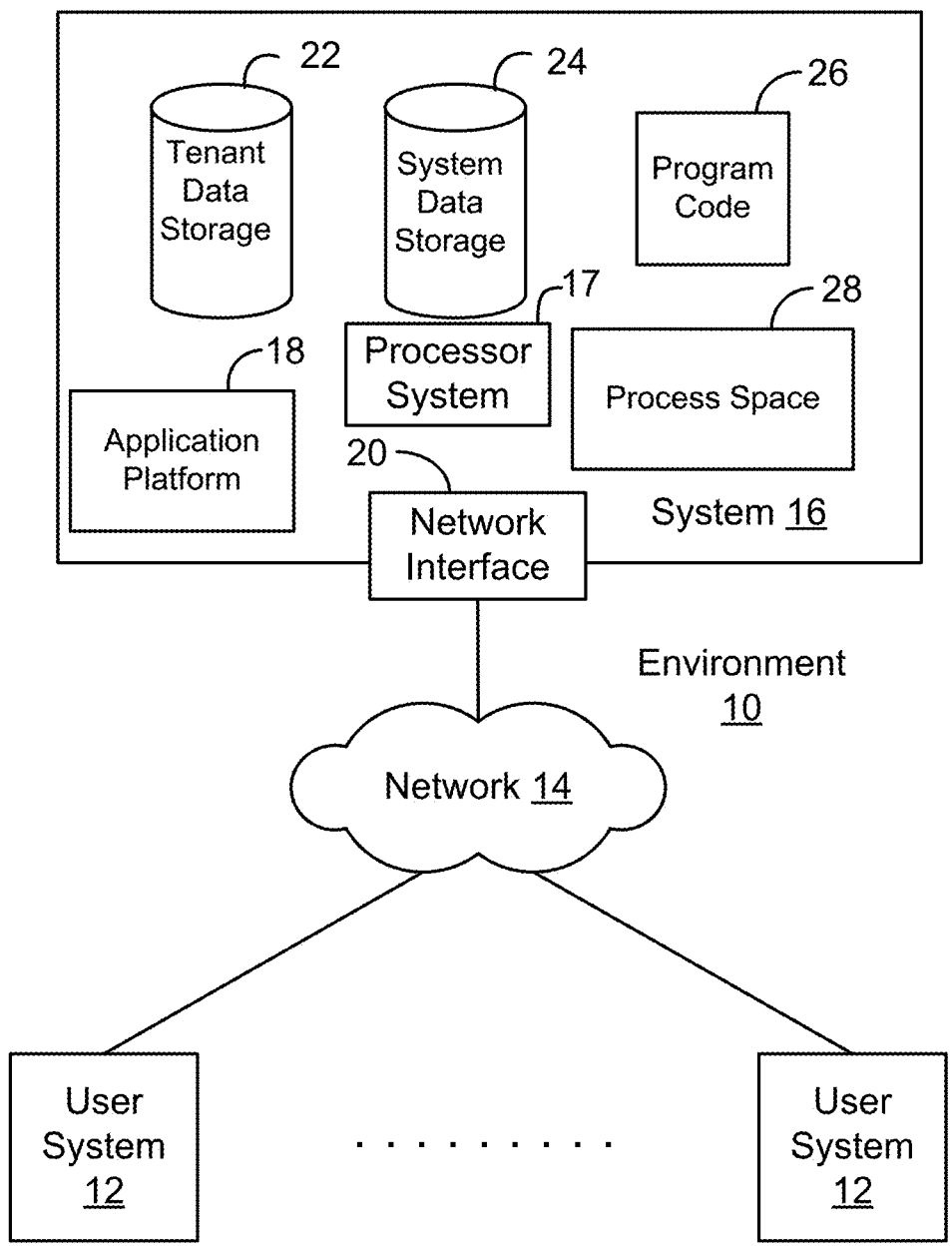
FIG. 1A shows a block diagram of an example of an environment 10 in which an on-demand database service can be used in accordance with some implementations.

Examples of systems, apparatus, methods, and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations, also referred to herein as "blocks," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Various implementations described or referenced herein are directed to different methods, apparatus, systems, and computer program products for providing an improved web user interface framework for building web applications.

Web application frameworks, or user interface (UI) frameworks, enable web developers to develop dynamic websites, web applications, and web services to run on a variety of platforms. UI frameworks are used in part to alleviate the overhead associated with common activities performed in web development. They may provide libraries for database access, templating frameworks, and session management, and they may also provide methods of code reuse for more efficient web application development.

Increasingly, UI frameworks are being used to develop dynamic web applications that are accessible from mobile devices. One key aspect of building web applications to be accessed from mobile devices is accounting for the bandwidth constraints that many mobile device users face. As such, it is desirable for a UI framework to minimize the amount of data and communication that needs to happen between the server hosting the web application and the client rendering the user interface of the web application. Some ways in which this can be done is by refreshing components displayed in the user interface only when necessary, that is, when a component's definition has been updated on the server. Moreover, caching component definitions locally, such that component definitions do not have to be requested from the server every time the user interface is refreshed, may also minimize the bandwidth usage of the web application.

A desirable feature of a UI framework is having a rich set of components that are reusable and extensible. A component may be any self-contained and reusable unit of a UI presenting a web application, such as a button, a text field, or a list, and a component may be used in any web application UI that includes the component. A component has a clear Application Programming Interface (API) that instructs a developer that wants to include the component in his application how to use the component. Having a clear API allows the internal implementation details of the component to be opaque to a user of the component. It also allows a component author to change the internal implementation details of the component without affecting the users of the component. A component may also have a component version identifier indicating the current version of the component.

In some of the disclosed implementations, a client machine may be displaying in a web browser an instance of a server-hosted web application that includes a set of components. Once the component definitions have been transmitted to the client machine, the client machine may locally cache the component definitions and use those cached definitions for the components to render the components in the user interface on the client machine. In the meantime, the component author may have pushed out an update of one of the components. Because the client machine is using a locally cached component definition, it is desirable to have a mechanism for detecting when an instance of a web application contains an out-of-date component and informing the client machine displaying that the user interface of that instance of the web application, while keeping the web application running smoothly.

Some of the disclosed implementations compute an application identifier for an instance of a web application. The application identifier is based on the component version identifiers for all of the components being used in the user interface for the instance of the web application. When a component is updated, the component version identifier for that component changes. When the component version identifier of a component changes, the calculation that generates the application identifier for the instance of the application containing the component will produce an updated application identifier that is different from the application identifier previously generated for the instance of the web application containing the previous component. By maintaining a server-side index of application identifiers for instances of web applications being displayed at various client machines, the server, upon being notified of an updated component, may determine which web application instances need to be updated.

A client machine displaying a user interface for a web application instance may identify the application identifier representing the version of the web application being displayed each time the client machine sends a request up to the application server. When the application is initially requested by the client machine, the server may compute and store an application identifier for the application in a database. However, when a component is updated, the server may go through the database and remove all application identifiers for web application instances containing the updated component. The next time that the client machine sends the server a request containing its application identifier, the server will be unable to find the application identifier in the database, which notifies the server that at least one component of the web application instance displayed on the client machine has been updated. The server may then inform the client machine accordingly. The client machine may then request a refresh of the user interface of the web application with the updated components. Thus, the disclosed implementations provide users of web applications to seamlessly view and interact with components that are concurrently being updated by component developers.

Another desirable feature for a UI framework is a mechanism for locally caching responses to server-side actions on the client. A client web application may benefit from caching data to reduce webpage response times by storing and accessing data locally rather than requesting data from the server. This may enhance the user experience on the client. In particular, caching is beneficial for high-performance, mostly-connected applications operating over high latency connections, such as 3G networks. Caching may also benefit applications running on devices that temporarily do not have a network connection by providing a mechanism for gracefully falling back on cached information when there is no server connectivity. Moreover, using radio networks on a mobile device is relatively costly, so minimizing radio network usage while operating a web application could be advantageous in terms of both cost and efficiency.

In some of the disclosed implementations, the web application may transmit a request to the server to perform a server-side action. For actions that are frequently performed by the server, it may be advantageous to cache, on the client, the responses to frequently performed actions so that they may be quickly retrieved at a later time without performing another server request. These actions may be identified by the UI framework as "storable actions." The action results may be stored in the cached and the results may be indexed by the action. In that way, when a component requests that a storable action be performed by the server, the web application may first check the cache to see if there is a response that can be supplied to the component without submitting a new request to the server.

The manner in which requests from various components of a web application to execute storable actions are sent to the server and the manner in which responses are received from the server may be managed by an API that facilitates communication between the client and server at a layer of abstraction above the individual XML HTTP requests from various components of an application. The API allows the web application to manage the multiple simultaneous connections between the components of the application and the server. Requests from the various components may be coordinated, bundled, and transmitted to the server in a single request to be executed on the server. The results of the executed storable actions may be bundled and transmitted back to the web application in a single response as well.

On the client end, a local caching policy may determine how storable action results received from the server are cached and/or provided to the components requesting the storable actions. The local caching policy may dictate what type of storage to use when caching the results of a storable action. The storage type may be persistent and/or durable. Depending on the user's selection of what storage type to use, various storage adapters may be provided by the UI framework to interact with the cache. For example, the metadata involved in determining how account information should be displayed in an application may be rather large, relative to the actual account information being displayed, and it may be desirable to keep the account display metadata cached locally so that it does not need to be retransmitted from the server every time an account is displayed. It would be desirable for the storage used for the account display metadata to be persistent, so that the browser does not delete the metadata between browser sessions, requiring another request for the metadata.

The local caching policy may also include policies on how cached responses are provided to components requesting a storable action. The policies may be implemented on a per-action level or on global level. For example, the local caching policy may dictate that for a particular storable action, the web application should provide the cached response to the component requesting the storable action, as long as the cached response has not exceeded the expiration time of sixty minutes. As another example, the local caching policy may dictate that the web application provide the component with the cached response, while concurrently sending a request to the server for an updated response to the storable action. The component is first given the cached response, and when the updated response is subsequently returned by the server, the web application may provide the updated response to the component and update the cache with the updated response.

In other implementations, the response from the server may include the results of actions that were not requested by the web application. These results are "pre-fetched" results for storable actions that are predicted as likely to be requested by a component of the web application. The prediction may be performed using a set of heuristics that connect certain storable actions with other storable actions that are likely to be requested after the former storable actions are requested. For example, a user may send a request to the server to search for a particular opportunity based on a keyword. The server may identify a list of opportunities that match the keyword. The server may also predict that the user will select one or more of the opportunities in the list, and the server may pre-fetch the opportunities results by performing the appropriate server-side actions and send the pre-fetched results along with the opportunity list in the response to the server. Thus, when the user, when presented with the list of opportunities, selects the first opportunity, the web application may immediately serve up the opportunity information from the local cache, rather than sending another request to the server.

One other desirable feature of a UI framework is to be able to take the components that are developed within the UI framework and embed them in other web technologies. For example, there may be some components developed in the UI framework that have wide application outside of web applications built on the UI framework. In the disclosed implementations, these self-contained and reusable components may also be embedded in web applications hosted on other application servers, while the embedded components themselves may be hosted from the servers on which the components were developed. In this way, any web application using nearly any given web technology may take advantage of the components that are built and developed on the UI framework. The disclosed implementations provide a set of APIs to allow a user to embed such a component in a web application.

For example, the Dell Company employee intranet may include some objects in its content management system (CMS) that are also backed by a Salesforce database and are associated with a Salesforce record ID. An administrator of the Dell intranet may want to provide Dell employees navigating the intranet with a Chatter® feed component for viewing recent updates to objects in the CMS that are backed by the Salesforce database. The Chatter® feed is a component that is developed and hosted on the Salesforce servers, and the Dell administrator, using the disclosed implementations, may embed a context-sensitive Chatter® feed in the Dell intranet web application. As the user browses various objects in the Dell intranet, the Chatter® feed may automatically update to include updates pertaining to the objects that the user is browsing in the intranet.

These and other implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to, magnetic media such as hard disks, floppy disks, and magnetic tape; optical media such as CD-ROM disks; magneto-optical media; and hardware devices that are specially configured to store program instructions, such as read-only memory ("ROM") devices and random access memory ("RAM") devices. These and other features of the disclosed implementations will be described in more detail below with reference to the associated drawings.

I. General Overview

Systems, apparatus, methods, and computer program products are provided for implementing enterprise level social and business information networking. Such implementations can provide more efficient use of a database system. For instance, a user of a database system may not easily know when important information in the database has changed, e.g., about a project or client. Implementations can provide feed tracked updates about such changes and other events, thereby keeping users informed.

By way of example, a user can update a record, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed right to the manager's feed page or other page.

Next, mechanisms and methods for providing systems implementing enterprise level social and business information networking will be described with reference to several implementations. First, an overview of an example of a database system is described, and then examples of tracking events for a record, actions of a user, and messages about a user or record are described. Various implementations about the data structure of feeds, customizing feeds, user selection of records and users to follow, generating feeds, and displaying feeds are also described.

II. System Overview

FIG. 1A shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be implemented as any computing device(s) or other data processing apparatus such as a machine or system that is used by a user to access a database system 16. For example, any of user systems 12 can be a handheld computing device, a mobile phone, a laptop computer, a work station, and/or a network of such computing devices. As illustrated in FIG. 1A (and in more detail in FIG. 1B) user systems 12 might interact via a network 14 with an on-demand database service, which is implemented in the example of FIG. 1A as database system 16.

An on-demand database service, implemented using system 16 by way of example, is a service that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 1A, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 1B:
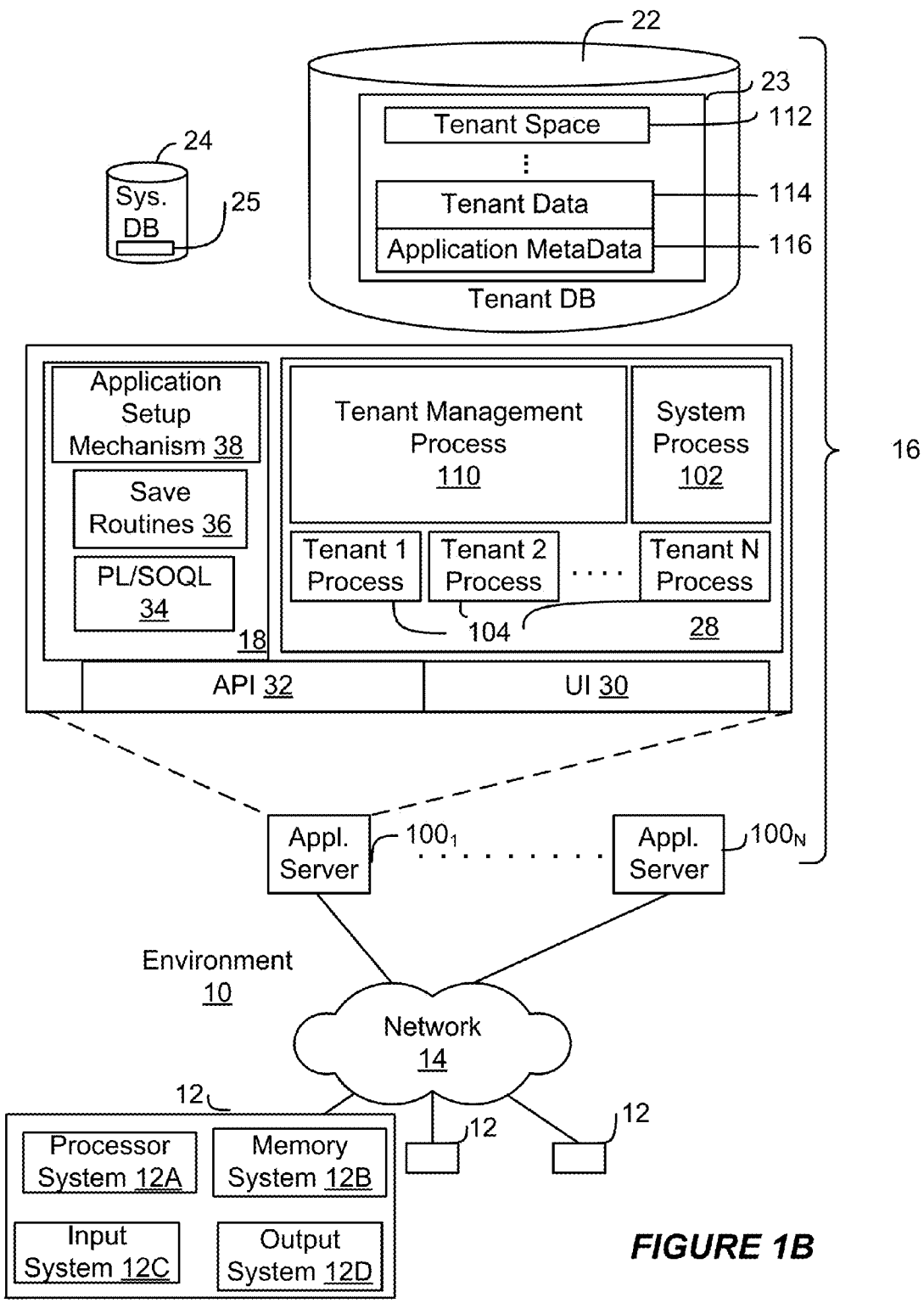
FIG. 1B shows a block diagram of an example of some implementations of elements of FIG. 1A and various possible interconnections between these elements.

One arrangement for elements of system 16 is shown in FIGS. 1A and 1B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server"

are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 1B shows a block diagram of an example of some implementations of elements of FIG. 1A and various possible interconnections between these elements. That is, FIG. 1B also illustrates environment 10. However, in FIG. 1B elements of system 16 and various interconnections in some implementations are further illustrated. FIG. 1B shows that user system 12 may include processor system 12A, memory system 12B, input system 12C, and output system 12D. FIG. 1B shows network 14 and system 16. FIG. 1B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers 1001-100N, system process space 102, tenant process spaces 104, tenant management process space 110, tenant storage space 112, user storage 114, and application metadata 116. In other implementations, environment 10 may not have the same elements as those listed above and/or may have other elements instead of, or in addition to, those listed above.

User system 12, network 14, system 16, tenant data storage 22, and system data storage 24 were discussed above in FIG. 1A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 1B, system 16 may include a network interface 20 (of FIG. 1A) implemented as a set of HTTP application servers 100, an application platform 18, tenant data storage 22, and system data storage 24. Also shown is system process space 102, including individual tenant process spaces 104 and a tenant management process space 110. Each application server 100 may be configured to communicate with tenant data storage 22 and the tenant data 23 therein, and system data storage 24 and the system data 25 therein to serve requests of user systems 12. The tenant data 23 might be divided into individual tenant storage spaces 112, which can be either a physical arrangement and/or a logical arrangement of data. Within each tenant storage space 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage space 112. A UI 30 provides a user interface and an API 32 provides an application programmer interface to system 16 resident processes to users and/or developers at user systems 12. The tenant data and the system data may be stored in various databases, such as one or more Oracle| databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server 1001 might be coupled via the network 14 (e.g., the Internet), another application server 100N-1 might be coupled via a direct network link, and another application server 100N might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain implementations, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one implementation, therefore, an interface system implementing a load balancing function (e.g., an F5 Big-IP load balancer) is communicably coupled between the application servers 100 and the user systems 12 to distribute requests to the application servers 100. In one implementation, the load balancer uses a least connections algorithm to route user requests to the application servers 100. Other examples of load balancing algorithms, such as round robin and observed response time, also can be used. For example, in certain implementations, three consecutive requests from the same user could hit three different application servers 100, and three requests from different users could hit the same application server 100. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 100 to request and update system-level and tenant-level data from system 16 that may involve sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
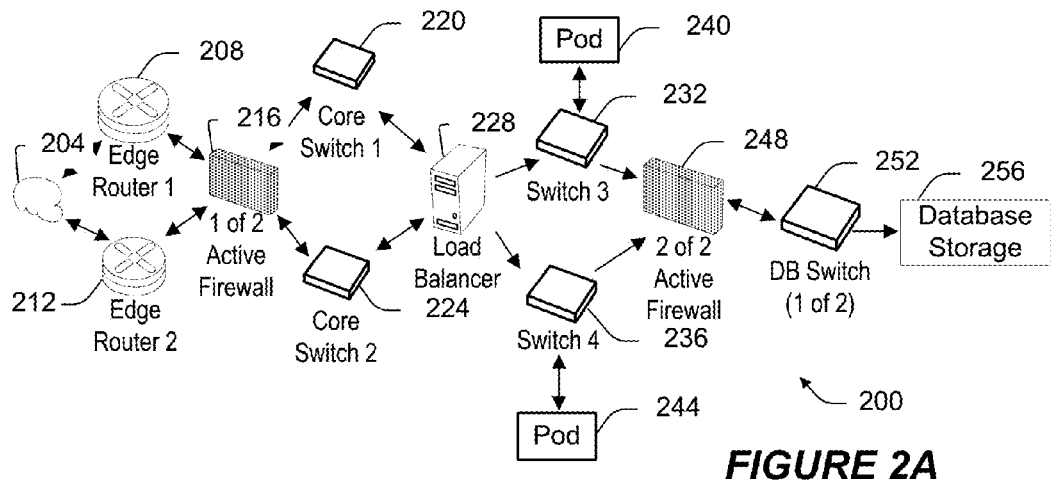
FIG. 2A shows a system diagram illustrating an example of architectural components of an on-demand database service environment 200 according to some implementations.

FIG. 2A shows a system diagram illustrating an example of architectural components of an on-demand database service environment 200 according to some implementations. A client machine located in the cloud 204, generally referring to one or more networks in combination, as described herein, may communicate with the on-demand database service environment via one or more edge routers 208 and 212. A client machine can be any of the examples of user systems 12 described above. The edge routers may communicate with one or more core switches 220 and 224 via firewall 216. The core switches may communicate with a load balancer 228, which may distribute server load over different pods, such as the pods 240 and 244. The pods 240 and 244, which may each include one or more servers and/or other computing resources, may perform data processing and other operations used to provide on-demand services. Communication with the pods may be conducted via pod switches 232 and 236. Components of the on-demand database service environment may communicate with a database storage 256 via a database firewall 248 and a database switch 252.

Figure 2B:
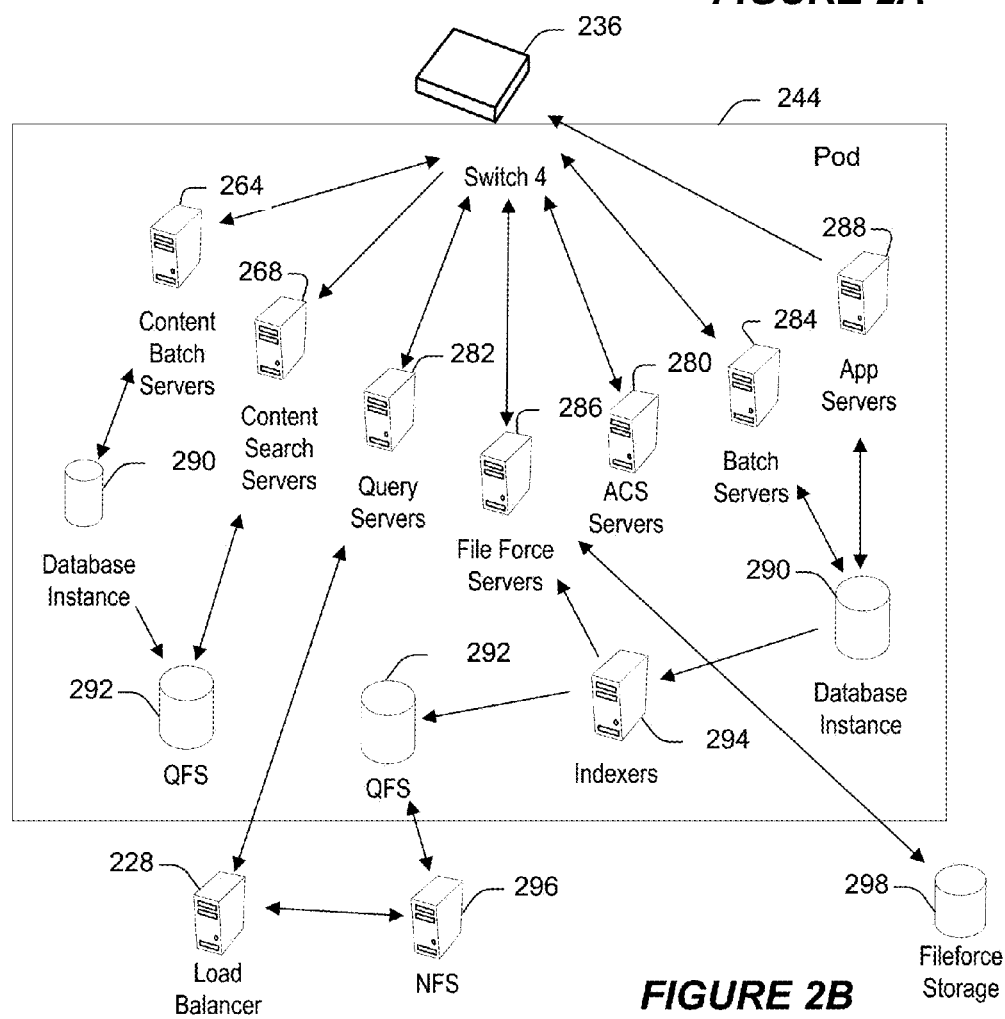
FIG. 2B shows a system diagram further illustrating an example of architectural components of an on-demand database service environment according to some implementations.

As shown in FIGS. 2A and 2B, accessing an on-demand database service environment may involve communications transmitted among a variety of different hardware and/or software components. Further, the on-demand database service environment 200 is a simplified representation of an actual on-demand database service environment. For example, while only one or two devices of each type are shown in FIGS. 2A and 2B, some implementations of an on-demand database service environment may include anywhere from one to many devices of each type. Also, the on-demand database service environment need not include each device shown in FIGS. 2A and 2B, or may include additional devices not shown in FIGS. 2A and 2B.

Moreover, one or more of the devices in the on-demand database service environment 200 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 204 is intended to refer to a data network or plurality of data networks, often including the Internet. Client machines located in the cloud 204 may communicate with the on-demand database service environment to access services provided by the on-demand database service environment. For example, client machines may access the on-demand database service environment to retrieve, store, edit, and/or process information.

In some implementations, the edge routers 208 and 212 route packets between the cloud 204 and other components of the on-demand database service environment 200. The edge routers 208 and 212 may employ the Border Gateway Protocol (BGP). The BGP is the core routing protocol of the Internet. The edge routers 208 and 212 may maintain a table of IP networks or 'prefixes', which designate network reachability among autonomous systems on the Internet.

In one or more implementations, the firewall 216 may protect the inner components of the on-demand database service environment 200 from Internet traffic. The firewall 216 may block, permit, or deny access to the inner components of the on-demand database service environment 200 based upon a set of rules and other criteria. The firewall 216 may act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 may be configured as network bridges that quickly route data between different components within the on-demand database service environment. In some implementations, the use of two or more core switches 220 and 224 may provide redundancy and/or reduced latency.

In some implementations, the pods 240 and 244 may perform the core data processing and service functions provided by the on-demand database service environment. Each pod may include various types of hardware and/or software computing resources. An example of the pod architecture is discussed in greater detail with reference to FIG. 2B.

In some implementations, communication between the pods 240 and 244 may be conducted via the pod switches 232 and 236. The pod switches 232 and 236 may facilitate communication between the pods 240 and 244 and client machines located in the cloud 204, for example via core switches 220 and 224. Also, the pod switches 232 and 236 may facilitate communication between the pods 240 and 244 and the database storage 256.

In some implementations, the load balancer 228 may distribute workload between the pods 240 and 244. Balancing the on-demand service requests between the pods may assist in improving the use of resources, increasing throughput, reducing response times, and/or reducing overhead. The load balancer 228 may include multilayer switches to analyze and forward traffic.

In some implementations, access to the database storage 256 may be guarded by a database firewall 248. The database firewall 248 may act as a computer application firewall operating at the database application layer of a protocol stack. The database firewall 248 may protect the database storage 256 from application attacks such as structure query language (SQL) injection, database rootkits, and unauthorized information disclosure.

In some implementations, the database firewall 248 may include a host using one or more forms of reverse proxy services to proxy traffic before passing it to a gateway router. The database firewall 248 may inspect the contents of database traffic and block certain content or database requests. The database firewall 248 may work on the SQL application level atop the TCP/IP stack, managing applications' connection to the database or SQL management interfaces as well as intercepting and enforcing packets traveling to or from a database network or application interface.

In some implementations, communication with the database storage 256 may be conducted via the database switch 252. The multi-tenant database storage 256 may include more than one hardware and/or software components for handling database queries. Accordingly, the database switch 252 may direct database queries transmitted by other components of the on-demand database service environment (e.g., the pods 240 and 244) to the correct components within the database storage 256.

In some implementations, the database storage 256 is an on-demand database system shared by many different organizations. The on-demand database system may employ a multi-tenant approach, a virtualized approach, or any other type of database approach. An on-demand database system is discussed in greater detail with reference to FIGS. 1A and 1B.

FIG. 2B shows a system diagram further illustrating an example of architectural components of an on-demand database service environment according to some implementations. The pod 244 may be used to render services to a user of the on-demand database service environment 200. In some implementations, each pod may include a variety of servers and/or other systems. The pod 244 includes one or more content batch servers 264, content search servers 268, query servers 282, file servers 286, access control system (ACS) servers 280, batch servers 284, and app servers 288. Also, the pod 244 includes database instances 290, quick file systems (QFS) 292, and indexers 294. In one or more implementations, some or all communication between the servers in the pod 244 may be transmitted via the switch 236.

In some implementations, the app servers 288 may include a hardware and/or software framework dedicated to the execution of procedures (e.g., programs, routines, scripts) for supporting the construction of applications provided by the on-demand database service environment 200 via the pod 244. In some implementations, the hardware and/or software framework of an app server 288 is configured to execute operations of the services described herein, including performance of the blocks of methods described with reference to FIGS. 3-9C. In alternative implementations, two or more app servers 288 may be included and cooperate to perform such methods, or one or more other servers described herein can be configured to perform the disclosed methods.

The content batch servers 264 may handle requests internal to the pod. These requests may be long-running and/or not tied to a particular customer. For example, the content batch servers 264 may handle requests related to log mining, cleanup work, and maintenance tasks.

The content search servers 268 may provide query and indexer functions. For example, the functions provided by the content search servers 268 may allow users to search through content stored in the on-demand database service environment.

The file servers 286 may manage requests for information stored in the File storage 298. The File storage 298 may store information such as documents, images, and basic large objects (BLOBs). By managing requests for information using the file servers 286, the image footprint on the database may be reduced.

The query servers 282 may be used to retrieve information from one or more file systems. For example, the query system 282 may receive requests for information from the app servers 288 and then transmit information queries to the NFS 296 located outside the pod.

The pod 244 may share a database instance 290 configured as a multi-tenant environment in which different organizations share access to the same database. Additionally, services rendered by the pod 244 may call upon various hardware and/or software resources. In some implementations, the ACS servers 280 may control access to data, hardware resources, or software resources.

In some implementations, the batch servers 284 may process batch jobs, which are used to run tasks at specified times. Thus, the batch servers 284 may transmit instructions to other servers, such as the app servers 288, to trigger the batch jobs.

In some implementations, the QFS 292 may be an open source file system available from Sun Microsystems® of Santa Clara, Calif. The QFS may serve as a rapid-access file system for storing and accessing information available within the pod 244. The QFS 292 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 268 and/or indexers 294 to identify, retrieve, move, and/or update data stored in the network file systems 296 and/or other storage systems.

In some implementations, one or more query servers 282 may communicate with the NFS 296 to retrieve and/or update information stored outside of the pod 244. The NFS 296 may allow servers located in the pod 244 to access information to access files over a network in a manner similar to how local storage is accessed.

In some implementations, queries from the query servers 222 may be transmitted to the NFS 296 via the load balancer 228, which may distribute resource requests over various resources available in the on-demand database service environment. The NFS 296 may also communicate with the QFS 292 to update the information stored on the NFS 296 and/or to provide information to the QFS 292 for use by servers located within the pod 244.

In some implementations, the pod may include one or more database instances 290. The database instance 290 may transmit information to the QFS 292. When information is transmitted to the QFS, it may be available for use by servers within the pod 244 without using an additional database call.

In some implementations, database information may be transmitted to the indexer 294. Indexer 294 may provide an index of information available in the database 290 and/or QFS 292. The index information may be provided to file servers 286 and/or the QFS 292.

III. Updating a Web Application Displayed on a Client Machine

Figure 3:
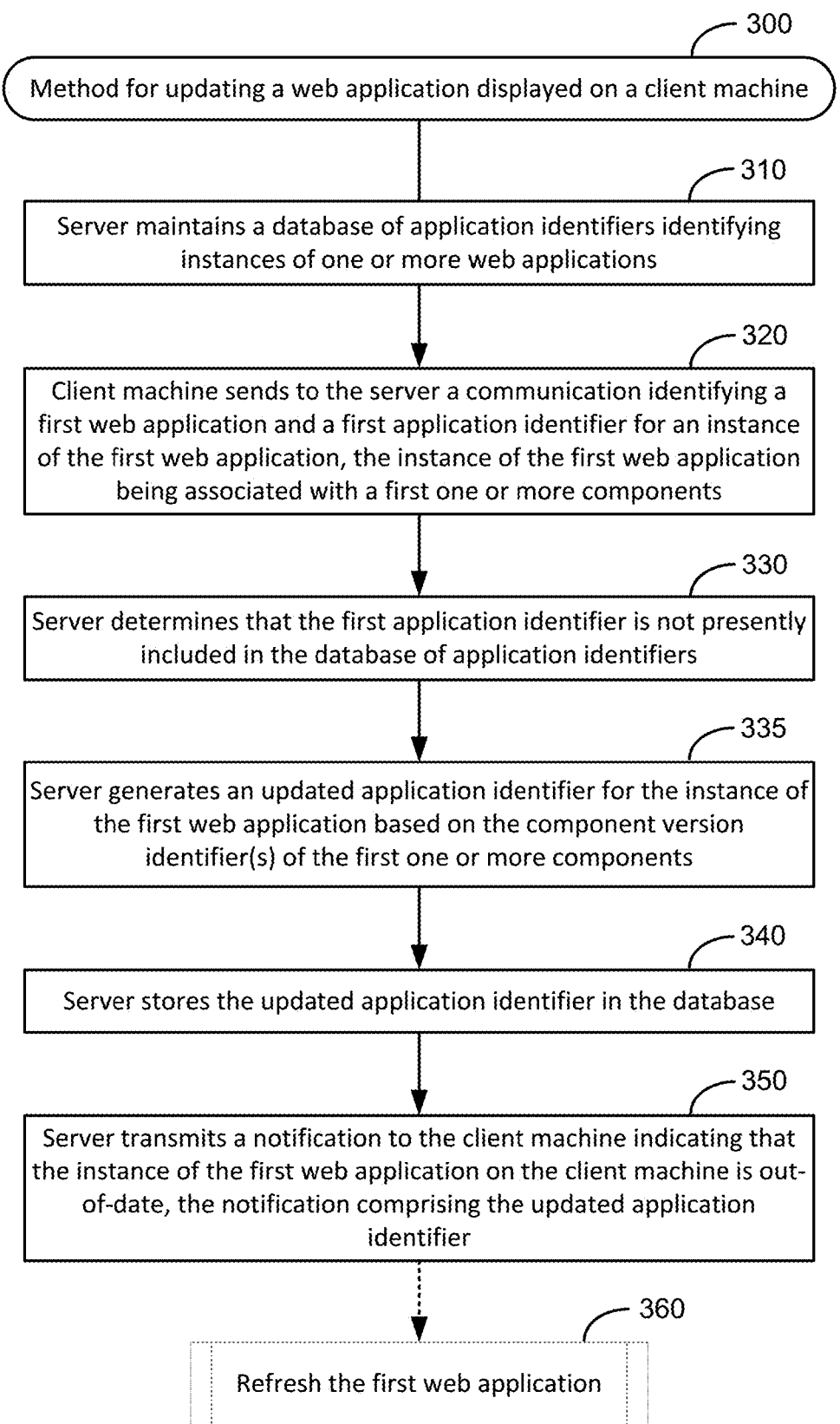
FIG. 3 shows a flowchart of an example of a computer implemented method 300 for updating a web application displayed on a client machine, according to some implementations.

FIG. 3 shows a flowchart of an example of a computer implemented method 300 for updating a web application displayed on a client machine, according to some implementations. The method 300 can be performed by or using any suitable computing device, computing system or any number of computing devices or systems that may cooperate to perform the method 300. In some implementations, each of the blocks of the method 300 can be performed wholly or partially by or using the database system 16 of FIGS. 1A and 1B, or other suitable devices or components (including processors) described herein, or the like.

In FIG. 3, at block 310, a server hosting the web application maintains a database of application identifiers. In some implementations, a web application may be hosted on one or more application servers and displayed in a browser of a mobile or desktop device. The web application may include one or more components that are developed within a UI framework. In some implementations, the UI framework may provide a set of prebuilt components that may be assembled and configured to form new components in a web application.

A component is a self-contained and potentially reusable section of UI. As a non-limiting example, a component may be a button, a text field, a date picker, a checkbox, or a dropdown list. A component may range in granularity from a single line of text to an entire application. In some implementations, a component may include other components within it, as well as HTML, CSS, JavaScript, or any other Web-enabled code. In some implementations, the browser of the client machine renders the components of an application to produce HTML DOM (Document Object Model) elements to be displayed within the browser. A component definition for a component may describe metadata for the component, such as the component's name, location of origin, or descriptor. A component descriptor may act as a key for a component definition stored in a registry.

In some implementations, by utilizing self-contained and reusable components, the UI framework may improve overall application development efficiency by facilitating parallel design. The UI framework may allow a developer building an application to extend a component, or to implement a component interface. A component may be encapsulated such that its internal implementation details remain private, while its public shape and interface is visible to consumers of the component. The public shape of a component may be defined by the attributes that can be set and the events that interact with the component. In some implementations, an API may expose these attributes and events to developers interacting with the component. Separating the component's internal implementation from its public shape may give component authors freedom to change the internal implementation details of the component while insulating component consumers from those changes. As such, a component consumer is allowed to focus on building his web application using components based on the components' published behavior and attributes, while the component author continues to innovate and make changes to the underlying implementation of the component.

Moreover, there may be different versions of a component, as the component author changes the underlying implementation of the component. Because the component author may update the implementation of a component while the component is being used in an instance of a web application, a web application may be regarded as "out-of-date" if there is a new version of one of the components of the web application available. A version of a component may be indicated with a component version identifier. As an example, a component version identifier for a component may be computed by performing an MD5 checksum of a concatenated string representing the contents of the component definition. A version of an instance of a web application displayed on a client machine may be indicated by an application identifier, which may be computed based on the component version identifiers of the components of the instance of the web application. As an example, the application identifier may be computed by performing an MD5 checksum of the concatenated component version identifiers of the application's constituent components. In this way, an application identifier for an instance of a web application may be used to determine whether the instance of the web application is up-to-date, that is, whether any of the web application's components have been updated.

Similarly, the application identifier may be used to determine whether a component has been reverted to a previous version. As an example, a component author may publish a new version of a component, and the new version may be provided to one or more component consumers via web applications containing the component. It may later be determined that the new version has a bug in it, and the component author may revert the component to a previous version.

In some implementations, two different instances of a web application may include different components, depending on the user interacting with the web application. In other words, one instance of a web application may include components that another instance of the web application may not. For example, one organization in an on-demand service environment hosting the web application may have access to more components and features than another organization utilizing the same web application on the same on-demand service environment. As another example, one user may have permissions that grant him access to particular components, and another user may not have those permissions. In some implementations, the position of the user within the organization may also factor into which components the user may access via the web application. In another example, the user may implement a personalization setting that causes particular components to not be displayed in the user's instance of the web application. In yet another example, a user may create a custom component that he wishes to add to the web application, such as a tab containing specific record information. The custom component may then appear when that user accesses the web application.

In another implementation, where there are multiple versions of a particular component, a user's personalization settings may designate a particular version of the component that is not the most recent version. As such, while most users of the web application will be presented with the latest version of the particular component, this user will be presented with the version that he selected in his personalization settings.

When an instance of a web application is first initialized, an application identifier may be computed for the instance and stored in a database accessible to the server hosting the web application. Re-computing the application identifier at a later time and comparing the re-computed application identifier with the stored application identifier may notify the server as to whether any of the components of the instance of the web application have been updated.

The server may maintain a database of application identifiers that each correspond to an instance of a web application displayed on a client machine and hosted by the server. As new instances of web applications are opened, a new application identifier for that instance may be calculated and stored in the database. When a client machine sends a request to the server, the request may include an application identifier for the version of the web application instance displayed on the client machine. This application identifier may be compared with the stored application identifiers to determine whether the version of the web application displayed on the client machine is current.

In some implementations, maintaining the database of application identifiers may involve removing particular application identifiers from the database when a component is updated, as described herein.

First, the server may determine that a component has been updated. The server may become aware of this in various ways. For example, when a component has been updated by a component author and saved to a component database, the server may receive a notification of the update. The notification may be provided by a database trigger. Alternatively, the server may poll the file system containing the component definitions to detect when a component has been updated by examining the last modified date of the component definition file. In another implementation, a file system monitor may notify the server of changes to the component definition files in the file system.

When the server determines that a component has been updated, the server may identify, in the database of application identifiers, any application identifiers that are associated with web applications containing the updated component. The definitions for the web applications may be stored in the database and indexed by the application identifiers, such that the server can determine from an application identifier stored in the database whether the web application associated with the application contains the updated component. The server may then remove from the database the application identifiers that correspond to web application containing the updated component.

Consequently, when a client machine displaying an outdated instance of a web application communicates with the server and provides the application identifier for the outdated instance of the web application, the application identifier will not be found in the database of application identifiers. An updated application identifier may be computed using the updated component's new component version identifier and compared to the application identifier provided by the client machine.

In some implementations, when it is determined that a component has been updated, instead of selectively dumping the application identifiers associated with applications containing the updated component, the server may dump all of the application identifiers. In this situation, the absence of an application identifier in the database of application identifiers does not necessarily mean that the instance of the web application displayed on the client machine is out-of-date. The absence of the application identifier in the database triggers a re-computation of the application identifier for the web application. In the case that none of the components have been updated, the re-computed application identifier will match the received application identifier, notifying the server that the instance of the web application is up-to-date. In the case that one or more of the components have been updated, the re-computed application identifier will be different from the transmitted application identifier, notifying the server that the instance of the web application is out-of-date.

In FIG. 3, at block 320, the client machine sends to the server a communication identifying a web application. The communication may be a request from an instance of the web application running on the client machine. An example of such a communication may be an XHR (XMLHttpRequest) request configured to trigger an action on the server. The request may be handled by a server-side controller running on the server. The first web application may be identified by the application name.

The communication also includes an application identifier corresponding to the instance of the web application running on the client machine. In some implementations, the application identifier is first received from the server when the client machine first requests the web application. The request for the web application may cause the server to compute the application identifier based on the version identifiers of all of the components of the requested web application. In some implementations, the client machine running the instance of the web application transmits the application identifier along with requests to the server to identify the web application and to inform periodic determinations of whether the instance of the web application is updated.

The web application that is identified by the communication received from the client machine may include a set of components, and each of the components running in that instance of the web application may have a component version identifier indicating the version of each component provided in that instance of the web application.

In FIG. 3, at block 330, the server searches the database of application identifiers and determines that the first application identifier received from the client machine in the received communication is not presently included in the database of application identifiers. In some implementations, this may indicate to the server that a component of the instance of the web application running on the client machine may be out-of-date.

In FIG. 3, at block 335, in order to determine whether one of the components is out-of-date, the server generates an updated application identifier for the instance of the first web application based on the component version identifiers of the one or more components. The server has access to the latest component versions for all of the components of the web application. As such, an updated application identifier may be computed based on those component versions to calculate an updated application identifier.

In some implementations, the application identifier may be computed by identifying the entire set of components directly used in the application. In some cases, one component may be declared as a dependency on another component if the one component is contained within the other component. As such, a dependency tree may be constructed containing all of the components of the web application and reflecting the dependencies between the components. The application identifier may then be computed by traversing the dependency tree and computing a hash of the component version identifiers of the components of the dependency tree.

In some situations, the updated application identifier matches the application identifier received from the client machine. This may indicate that the instance of the web application running on the client machine is up-to-date. In other situations, the updated application identifier is different from the application identifier received from the client machine, indicating that the instance of the web application running on the client machine includes at least one component that is out-of-date.

In FIG. 3, at block 340, the updated application identifier is stored in the database of application identifiers. The database may also store the application descriptor, name, and/or definition along with the identifier.

In FIG. 3, at block 350, a notification indicating that the instance of the first web application running on the first client machine is out-of-date is transmitted to the first client machine. The notification may also include the updated application identifier so that the client machine has a copy of the updated application identifier to submit along with subsequent communications with the server. In subsequent server requests from the client machine, as long as the updated application identifier is included with the server request, the presence of the updated application identifier in the database makes it unnecessary to re-compute the application identifier for the web application. The server, having received the updated application identifier and determined that the database contains the updated application identifier, may proceed to respond to the request.

When the client machine receives the notification from the server, the client machine may respond in various ways. In one implementation, the client machine, via the web application, may notify the user of the web application that a component has been updated on the server and that the client machine is providing an out-of-date version of the component. The user may be provided with an option to refresh the web application with an updated version of the component, or to continue displaying the web application with the out-of-date version of the component. In another implementation, upon receiving the notification indicating that a component is out-of-date, the client machine may automatically send a request to the server to refresh the web application.

Figure 4:
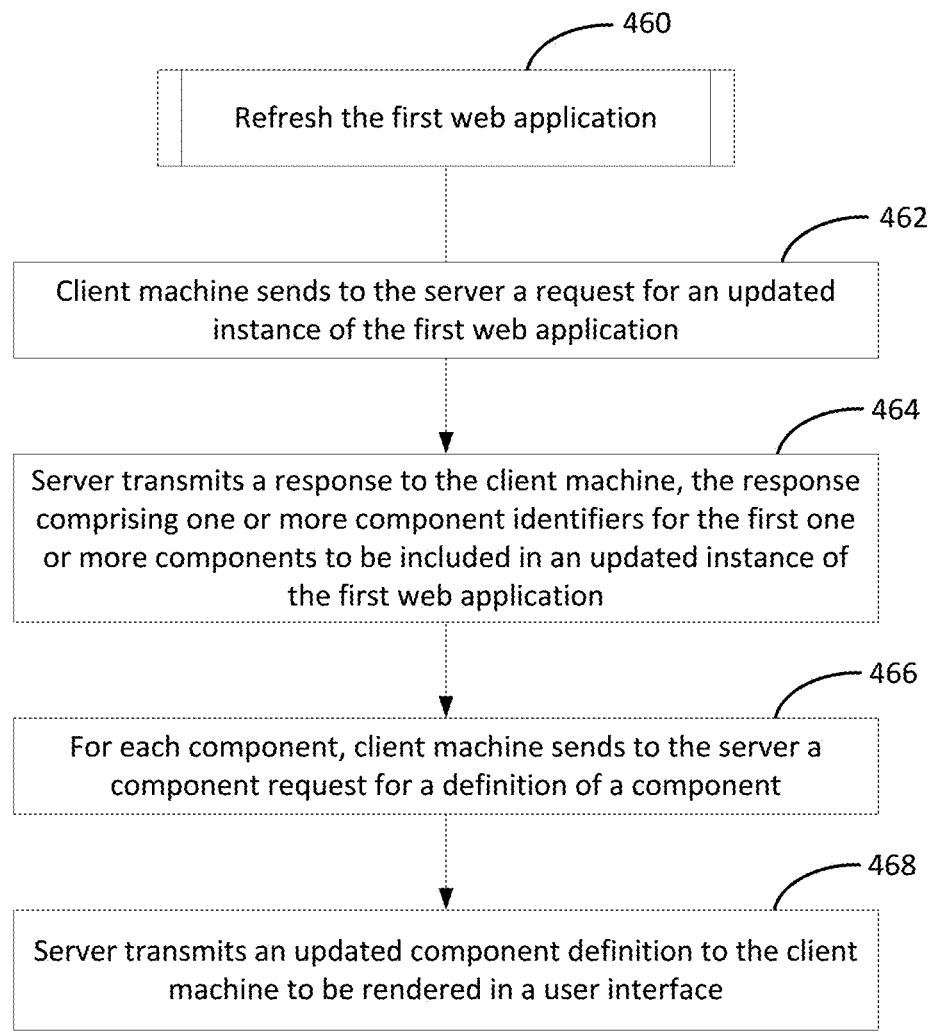
FIG. 4 shows a flowchart of an example of a computer implemented method 460 for refreshing a web application, according to some implementations.

In FIG. 3, at block 360, in an optional step, the server refreshes the web application by performing the method 460 of FIG. 4.

FIG. 4 shows a flowchart of an example of a computer implemented method 460 for refreshing a web application, according to some implementations. In FIG. 4, at block 462, the server receives, from the client machine, a request for an updated instance of the first web application. The client machine, having received the notification transmitted by the server indicating that the client machine's instance of the web application is out-of-date, may then transmit a request to the server for an updated version of the web application. The request that the client machine transmits to the server may include the application name, or a unique descriptor for the application that allows the server to identify all of the components of the application.

The server may then, based on the descriptor for the application, look for all of the components that are required to build an instance of the application on the client machine. As described above, the required set of components may be identified by constructing a dependency tree reflecting the dependencies between the components of the application. Given the set of components required to build the web application, the server may then re-compute an application identifier for the instance of the web application based on the component versions of all of the constituent components.

In FIG. 4, at block 464, the server responds to the client machine's request by transmitting a set of component identifiers to the client machine. The set of component identifiers allows the client machine to use the component identifiers to request each constituent component of the web application to be rendered in the refreshed instance of the web application. In some implementations, each component identifier may be a URL (uniform resource locator) or URI (uniform resource identifier) that the client machine may subsequently submit via an HTTP request to the server to receive a component definition for the component identified by the component identifier. As an example, the set of component identifiers may be a set of URL's that the server transmits to the client.

In FIG. 4, at block 466, for each component to be rendered in the refreshed instance of the web application, the client machine transmits a request to the server for a definition of the component. As mentioned above, the request may be an HTTP request to the server using the component identifier for the component. Once the server receives the HTTP request, the server may then build or retrieve the component definition, instantiate the component definition, and send the component definition and instance to the client machine.

In FIG. 4, at block 468, for each component to be rendered at the client machine, the server transmits the updated component definition to the client machine to be rendered in the user interface of the refreshed instance of the web application. The client that receives the component definition uses the component definition to render the component in the user interface.

Figure 5:
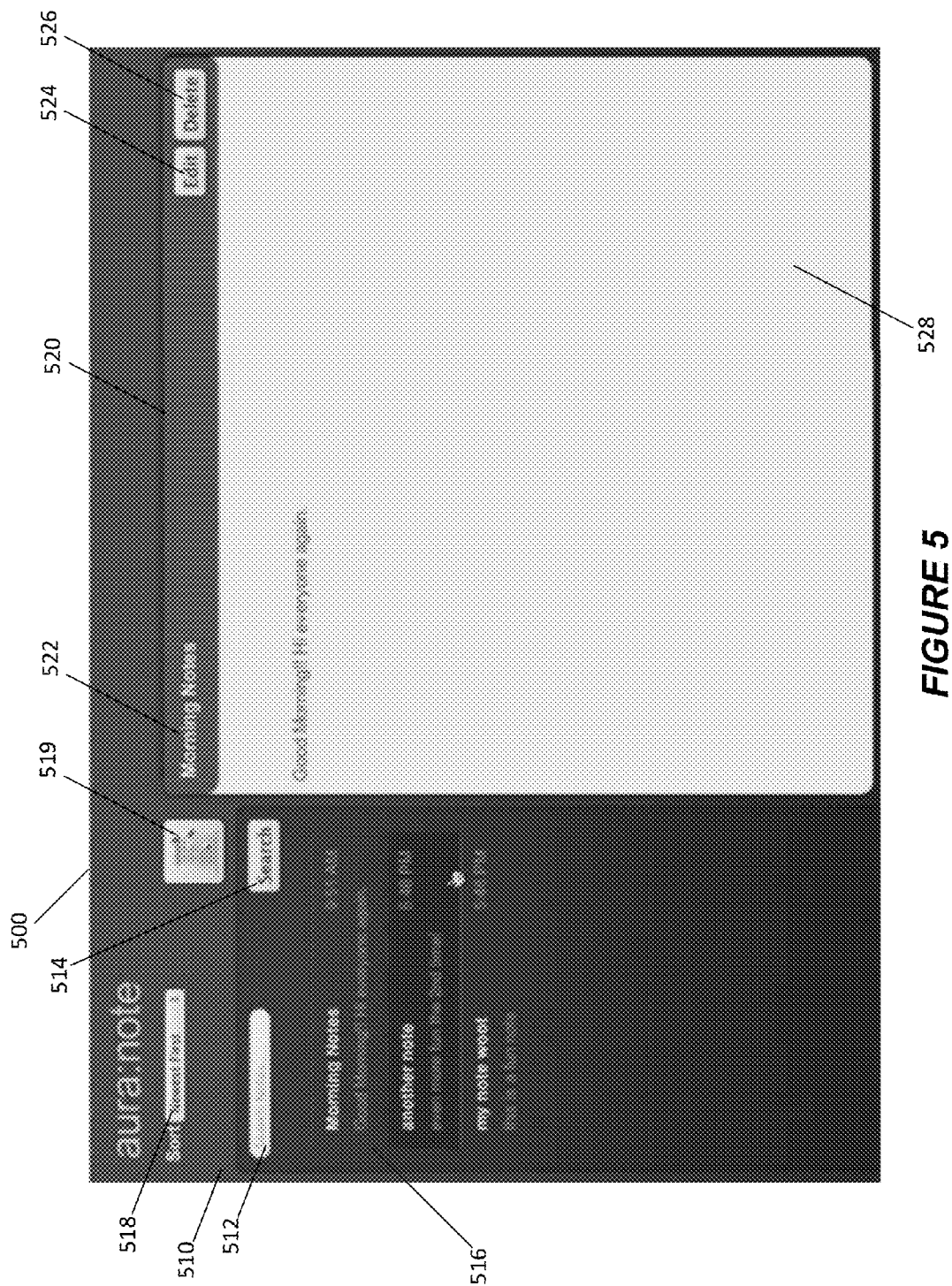
FIG. 5 shows an example of a graphical user interface (GUI) 500 for a web application containing one or more components, according to some implementations.

FIG. 5 shows an example of a graphical user interface (GUI) 500 for a web application containing one or more components, according to some implementations. FIG. 5 includes a user interface 500 for an example application, "aura:note," which allows a user to compose, display, sort, and search through one or more notes. The application includes a note list component 510, which includes a search field component 512, a search button component 514, a list component 516, a sort menu component 518, and a create note component 519. The application also includes a note composition component 520, which includes a header component 522, an edit button component 524, a delete button component 526, and a text box component 528.

These components of the "aura:note" application may be updated by the component authors while a user is interacting with an instance of the application via a browser of, say, his mobile smartphone. For example, the list component 516 may have received an update from the component author, but the client machine may be displaying the old version of the list component. The server may determine that the instance of the web application running on the client is out-of-date when the instance of the web application sends a request to the server along with an application identifier. The server, having discarded from the database of application identifiers the application identifiers for instances of the web application that contain the updated component, will search the database and find that the received application identifier does not exist in the database. As described above, the server may compute a new application identifier, determine that the new identifier is different from the application identifier received from the client machine, and send a notification to the client machine indicating that the instance of the web application running on the client machine is out-of-date.

Figure 6:
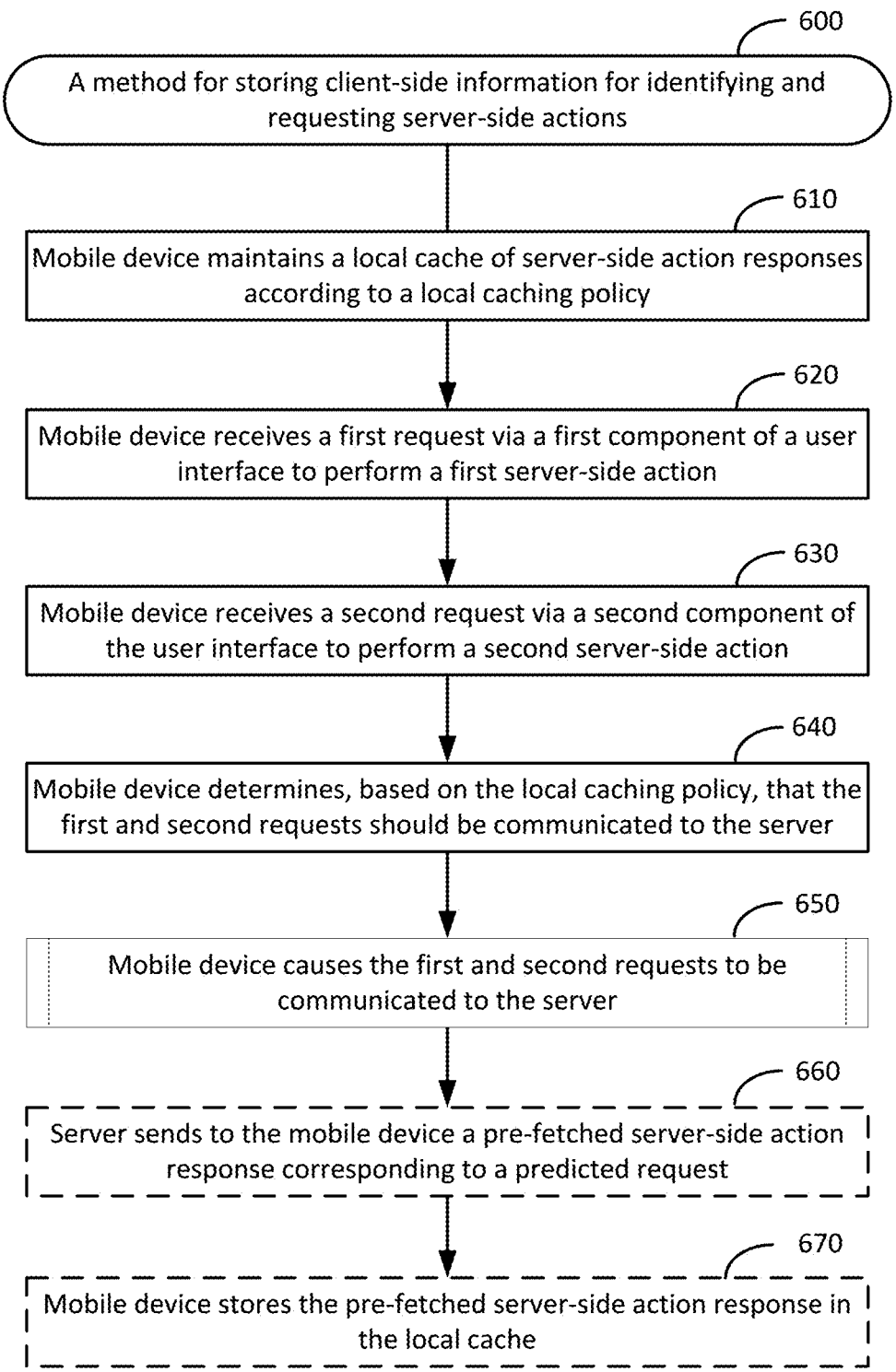
FIG. 6 shows a flowchart of an example of a computer implemented method 600 for storing client-side information for identifying and requesting server-side actions, according to some implementations.

IV. Storing Client-Side Information for Identifying and Requesting Server-Side Actions FIG. 6 shows a flowchart of an example of a computer implemented method 600 for storing client-side information for identifying and requesting server-side actions, according to some implementations. The method 600 can be performed by or using any suitable computing device, computing system or any number of computing devices or systems that may cooperate to perform the method 600. In some implementations, each of the blocks of the method 600 can be performed wholly or partially by or using the database system 16 of FIGS. 1A and 1B, or other suitable devices or components (including processors) described herein, or the like.

In FIG. 6, at block 610, a mobile device displaying a user interface for a web application maintains a local cache storing client-side information. As a user of the mobile device interacts with the web application, the web application responds to the user's interactions by transmitting requests to the server hosting the web application. When the web application receives the server's responses to the transmitted requests, the web application may store the responses in a local cache, such that if the same requests are performed at a later time, the web application can use the cached responses to provide the responses, rather than sending another request to the server. By locally caching particular server responses, the web application can reduce bandwidth usage, server load, and perceived lag in interactions with the application.

In some implementations, the local cache may contain one or more server-side action responses indexed by an identifier for the server-side action that generated each respective server-side action response. The identifier for the server-side action may be a digital fingerprint or hash function associated with the server-side action for uniquely identifying the server-side action in the local cache.

In some implementations, maintenance of the local cache—adding and removing server-side action responses, and determining when to use the stored action responses—may be performed according to a local caching policy. The local caching policy may be determined by a user of the web application, or an administrator of the server hosting the web application. The local caching policy may dictate a number of different behaviors with respect to the local cache.

For example, a user interacting with the web application on his mobile device may set up a set of policies for when the local cache should be used. In response to a request from a component of the web application to perform a server-side action, the default behavior may be to never use the local cache, in which case every request to perform a server-side action will trigger a request to the server. A user may prefer this policy if he is interacting with a web application that displays information that is frequently changing. Alternatively, the default behavior may be to immediately return to the component the most recently cached response, followed by transmitting the request over to the server to get an updated response to the server-side action. If the updated response is different from the cached response, the cached response may be replaced, and the updated response may then be provided to the component that requested the server-side action. This may be advantageous so that the user does not experience any lag in his interactions with the web application, and so that the user eventually gets the updated response from the server.

As another example, the user can set the local caching policy to include an expiration time for locally cached server responses. The user can set the expiration time according to his understanding of how often he thinks the data he is interacting with will actually be refreshed. For example, if the user is a salesperson using the web application to monitor constantly changing sales and opportunities data, he may set the expiration time to a shorter period of time, so that the data displayed in the web application is frequently refreshed from the server. In some implementations, the expiration time may be specified for a particular component of the web application. This may be desirable for components that display data that is frequently being updated, such as stock information. In some implementations, the other components may be displaying primarily static data, so it would be desirable to be able to set a short expiration time for a stock ticker component, and a longer expiration time for the other components.

In another example, the local caching policy can specify that locally cached server responses should only be used when the mobile device is offline and is unable to connect to the server.

In FIG. 6, at block 620, the mobile device, via a first component of the user interface, may receive a request to perform a first server-side action on the server. The local cache, which includes the locally cached server-side responses, may include a response for the requested server-side action.

In FIG. 6, at block 630, the mobile device may also receive a request from another component of the web application to perform a second server-side action on the server. The local cache may also include a cached response for the requested second server-side action.

In FIG. 6, at block 640, the mobile device, given the two server-side action requests, determines, based on the local caching policy, that the web application should communicate both requests to the server to perform the requested server-side actions. Alternatively, the local caching policy may dictate that the mobile device just serve up the locally cached responses without sending the server a request. In some implementations, as discussed above, the local caching policy may cause the web application to provide the locally cached responses to the components and to send the requested server-side action requests to the server to retrieve updated responses.

In other implementations, the local caching policy may determine that the first cached server-side response be served to the requesting component without sending the first server-side action request to the server, and that the second server-side action request be transmitted to the server. When the second server-side action request is transmitted to the server, the local caching policy may determine that the second component wait for the server-side action response to be received from the server before providing response data to the second component.

In FIG. 6, at block 650, the mobile device causes the first and second requests to be communicated to the server. Because the local caching policy may be implemented in an application programming interface (API) that provides a layer of abstraction above the individual server requests from each component of the web application, the API may manage all of the requests for the server from the client-side components of the web application by batching the individual requests, sending them to the server together to be executed, returning the responses, caching them as appropriate, and serving them up to the requesting components. The API may also handle the policy decisions of when to serve up a locally cached response to a server-side action request from a component, or when to send a request to the server for an updated response. In some implementations, the API may be a part of the user interface framework that is used to build the web application, allowing a developer of a web application to just set his local caching policies and allow the framework to handle the policy logic in responding to server-side action requests from the various components of the web application.

In another implementation, the local caching policy may determine that the second request should not be transmitted to the server when the local cache already contains a cached response to the second request. Alternatively, the local caching policy may determine that the second request should not be transmitted to the server when an identical request was previously transmitted to the server and the client web application is still awaiting a response from the server.

Figure 7:
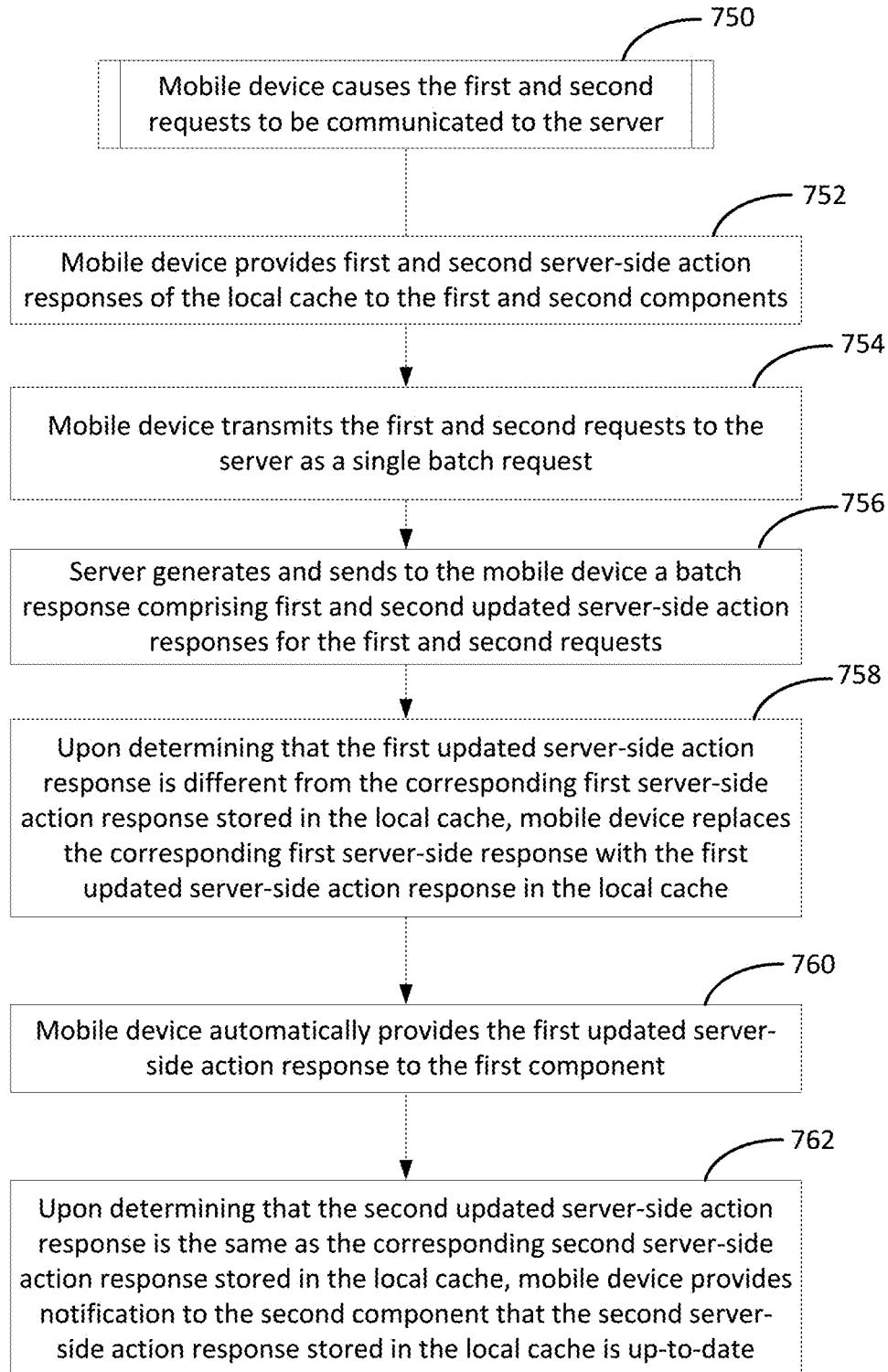
FIG. 7 shows a flowchart of an example of a computer implemented method 750 for a mobile device causing the first and second requests to be communicated to the server, according to some implementations.

FIG. 7 shows a flowchart of an example of a computer implemented method 750 for a mobile device causing the first and second requests to be communicated to the server, according to some implementations. The method 750 can be performed by or using any suitable computing device, computing system or any number of computing devices or systems that may cooperate to perform the method 750. In some implementations, each of the blocks of the method 750 can be performed wholly or partially by or using the database system 16 of FIGS. 1A and 1B, or other suitable devices or components (including processors) described herein, or the like.

In some implementations, the mobile device running the web application may provide the two cached responses to the requesting components. In this way, the components can be instantly updated based on locally cached information without requiring the user to wait on the server for a response. In some implementations, providing a component with the locally cached information may not provide any new information to the component, as the component may have previously been updated with the cached information.

In another implementation, however, a server-side action response may have been cached without providing the updated response to the requesting component. This may occur when the component submits a request for a server-side action that takes the server longer than expected to complete. The component may have continued operating without waiting for the response from the server. The response may subsequently arrive from the server and be directly stored in the local cache without providing the response to the requesting component. The requesting component may then request the same server-side action. In such a case, providing the requesting component with the cached response will give the component an updated response.

In FIG. 7, at block 752, the mobile device transmits the first and second requests to the server as a single batch request. As discussed above, the user interface framework used for building the web applications may utilize an API to manage simultaneous connections between each component of a web application and the server. One way in which the web application may manage these simultaneous connections is by bundling multiple requests from different components into a single batch request and sending the batch request to the server. The bundled requests may have been created around the same point in time, in which case bundling the requests into a single batch request may save on bandwidth and other resources required for transmitting the requests without sacrificing significant response time for the requests.

In FIG. 7, at block 754, the mobile device may receive from the server a batch response that includes updated server-side action responses for the first and second requests that were transmitted to the server in the single batch request.

In some implementations, where a server-side action may take a longer time to execute, the batch response might include a server-side action response for only one of the requests that was transmitted to the server in the batch request. In this case, the longer server-side action may return a response in a later batch response from the server to the mobile device.

In some implementations, the batch response may also include delayed responses to server-side action requests that were submitted to the server in previous batch requests. This may occur where a previous batch request included a server-side action that took longer than expected to execute on the server. The response may be sent back to the client web application with a subsequent batch response.

In FIG. 7, at block 756, the mobile device determines that the first updated server-side action response in the batch response is different from the corresponding first server-side action response that was previously stored in the local cache. In other words, the response that is currently stored in the local cache is out-of-date.

In FIG. 7, at block 758, the mobile device replaces the cached first server-side response with the first updated server-side action response, so that the local cache contains the updated response information.

In some implementations, the local caching policy may dictate that no responses should be cached for the first server-side action. In some implementations, when the mobile device stores a response in a local cache, the response may be stored in one of various types of local storage using a storage service provided by the UI framework. The storage service may provide a caching infrastructure for clients running web applications using the UI framework, in which several types of storage are offered through adapters. Storage may be persistent and/or secure. With persistent storage, cached data may be preserved between user sessions in the browser running the web application. With secure storage, cached data may be encrypted. Different storage adapters may correspond to the different types of storage that may be utilized for the local cache. For example, when the application requests persistent but not secure storage, the application may be provided with a WebSQL adapter, which provides access to a client-side SQL database. If the application requests storage that is not persistent but secure, the application may be provided with access to the JavaScript main memory space for caching data. The stored cache may persist only per browser page, such that browsing to a new page resets the cache.

When the storage is initialized, the web application developer may designate certain options, such as the name of the storage, whether the storage is persistent and/or secure, the maximum cache size, the expiration time, and the auto-refresh interval. The expiration time may specify the duration after which an item stored in the cache should be replaced with a fresh copy. The auto-refresh interval may take effect if an item has not expired yet. If the refresh interval for an item has passed, the item may get refreshed after the same action is called.

What type of storage to use for caching purposes may be determined by the local caching policy, which may be designated by the application developer.

In FIG. 7, at block 760, the mobile device, upon receiving the batch response containing the first updated server-side action response, automatically provides the updated response to the first component. The response may be provided to the component before or after the local cache is updated with the updated response. The first component, upon receiving the updated response, may display the response data or process the data as determined by the client-side controller running on the mobile device.

In FIG. 7, at block 762, the mobile device may determine that the second updated server-side action response matches the locally cached second server-side action response. This may indicate that the response has not changed, and the cached response is already updated.

In FIG. 7, at block 764, the web application may then notify the second component that the cached second response is up-to-date. The second component may respond by displaying an indication that the displayed information is up-to-date. Alternatively, the second component may simply continue to run in the web application.

Returning to FIG. 6, at block 660, in an optional step, the mobile device may also receive, in the batch response from the server, a pre-fetched action response corresponding to a predicted server-side action request. In some implementations, in addition to sending back responses to previously submitted action requests, the server may also, based on previously submitted action requests, generate one or more server-side actions that are likely to be subsequently requested. In this way, the server can anticipate future server-side actions, execute the anticipated actions, and send the responses to the web application to be cached to be provided when the web application requests the anticipated actions. This may save on bandwidth usage for server requests, and may improve the response speed for the web application for responses that have been pre-fetched and cached locally.

The server may utilize one or more prediction rules to predict server-side actions that are likely to be subsequently requested by a component. For example, it may be that a sales agent that requests information for an account is likely to subsequently request the most recent sales opportunities associated with the account. As such, the prediction rule may dictate that when an incoming batch request includes a request for account information, the batch response should include, in addition to the account information, opportunity information for the three most recent opportunities for that account. In some implementations, the prediction rules may be based on a role or personalization settings of the user of the web application. As another example, if a user searches for an account, and the search turns up a list of four accounts, it may be likely that the user will click on each of those accounts to request more information. In this case, a prediction rule may determine that when a batch request includes a search request that returns a list of accounts, account information for those accounts should also be obtained from the server and provided in the batch response so that the user can quickly access each of the accounts of the search list. A prediction rule may consist of one or more criteria actions and one or more pre-fetch actions, whereby, when the criteria actions are requested by the client web application, the one or more pre-fetch actions are also executed on the server, and the pre-fetch responses are provided in the batch response to be cached on the client.

In FIG. 6, at block 670, in another optional step, the mobile device stores the pre-fetched response in the local cache. When a component of the web application subsequently requests the same server-side action response, the cached pre-fetched response may be provided to the component without submitting a request to the server.

V. Displaying in a Web Browser a Web Application with an Embedded Component

Figure 8:
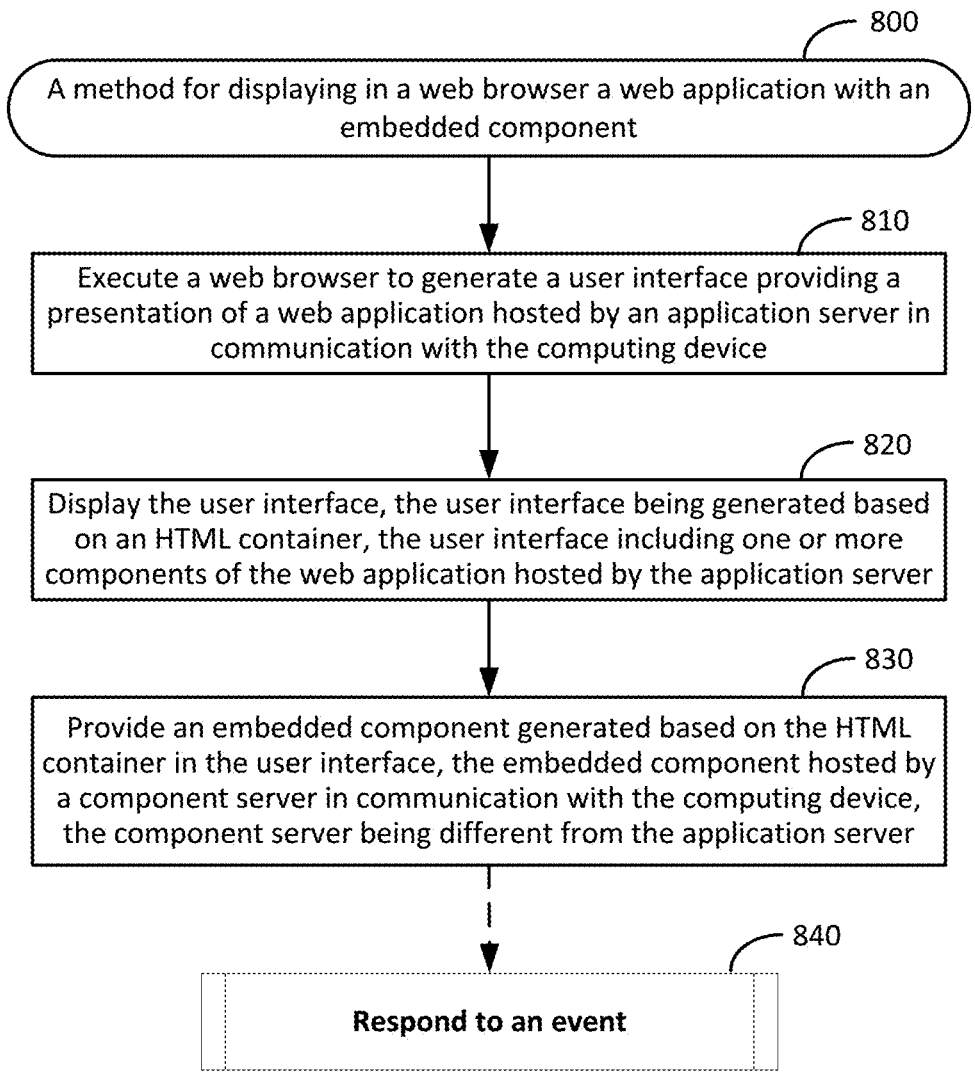
FIG. 8 shows a flowchart of an example of a computer implemented method 800 for displaying in a web browser a presentation of a server-hosted web application with an embedded component, according to some implementations.

FIG. 8 shows a flowchart of an example of a computer implemented method 800 for displaying in a web browser a presentation of a server-hosted web application with an embedded component, according to some implementations. The method 800 can be performed by or using any suitable computing device, computing system or any number of computing devices or systems that may cooperate to perform the method 800. In some implementations, each of the blocks of the method 800 can be performed wholly or partially by or using the database system 16 of FIGS. 1A and 1B, or other suitable devices or components (including processors) described herein, or the like.

In FIG. 8, at block 810, a mobile device running a web application executes a web browser, which generates a user interface for a web application. The web application is hosted by an application server in communication with the computing device. In some implementations, the web application may be an application developed and hosted by a user on one or more application servers.

In FIG. 8, at block 820, the mobile device displays the user interface of the web application. The display of the user interface includes an HTML container. The HTML container may contain HTML markup for displaying information for various components of the web application in the user interface. The mobile device may use the HTML markup in the HTML container to render the user interface of the web application.

In FIG. 8, at block 830, the mobile device also provides an embedded component for display in the user interface. The embedded component may be rendered based on code within the HTML container. The embedded component, perhaps unlike some of the other components of the user interface, is hosted from a component server, different from the application server, in communication with the mobile device. The component server may include a set of self-contained and embeddable components developed by other users to be imported into other web applications and presented to users of the other web applications.

The resulting web application may include components hosted from the application server that hosts the web application, as well as embedded components hosted by the component server. All of the components may be rendered based on HTML markup provided within the HTML container of the web application. These components may communicate with one another using a set of API's that create a transport layer that permits secure and authenticated cross-domain communication between the embedded component hosted on the component server and the components hosted on the application server. In some implementations, the authentication for the cross-domain communication may be performed by any authorization framework that enables a third-party application to obtain limited access to a web service, such as OAuth. The cross-domain communication may be accomplished using iframes, HTML5, or the like. An example of an API that facilitates this cross-domain capable transport layer is Salesforce Canvas™.

In some implementations, the components of the web application are able to communicate with one another by raising events and listening to events raised by other components. For example, a component may include event handlers to respond to events raised by another component. In some implementations, the raised event may be triggered by user interaction, such as clicking on a component. In other implementations, the raised event may be triggered by activity not involving any user interaction. An event may include attributes that can be set before the event is fired and read when the event is handled by an event handler of a component. The component may publish a set of interface events that it understands and is configured to respond to. In some implementations, a client-side controller may handle the events within a component. The client-side controller may be a JavaScript file that defines the functions for all of the component's actions performed in response to detected events.

In FIG. 8, at block 840, in an optional step, the mobile device responds to an event raised by one of the components of the web application, as described below in methods 930 and 940 of FIGS. 9A and 9B.

Figure 9A:
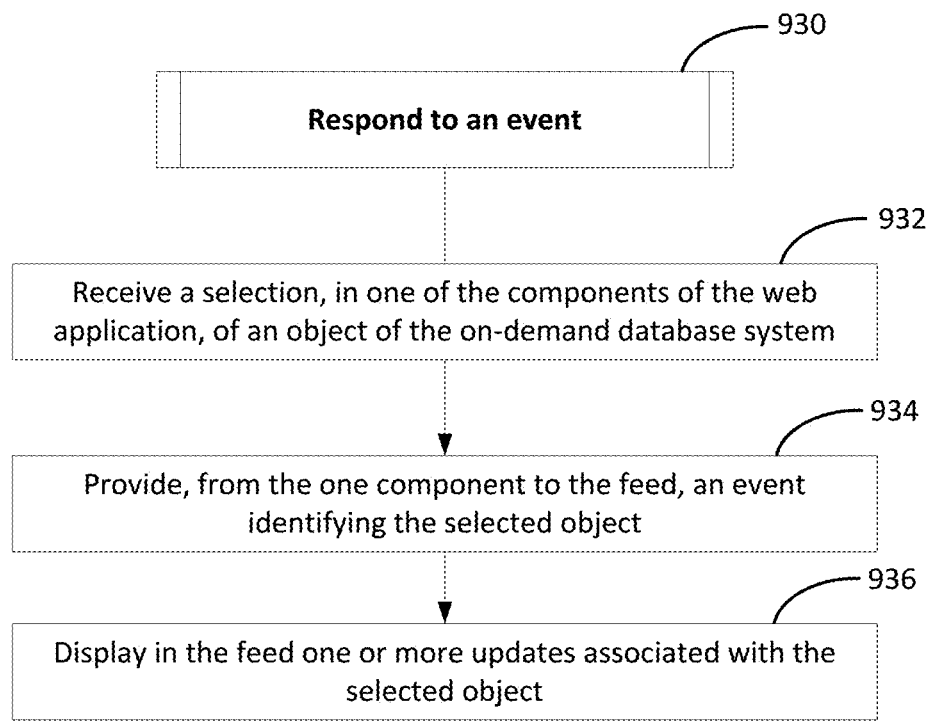
FIGS. 9A and 9B show flowcharts of examples of computer implemented methods 930 and 940 for responding to an event raised by a component of the web application, according to some implementations.
Figure 9B:
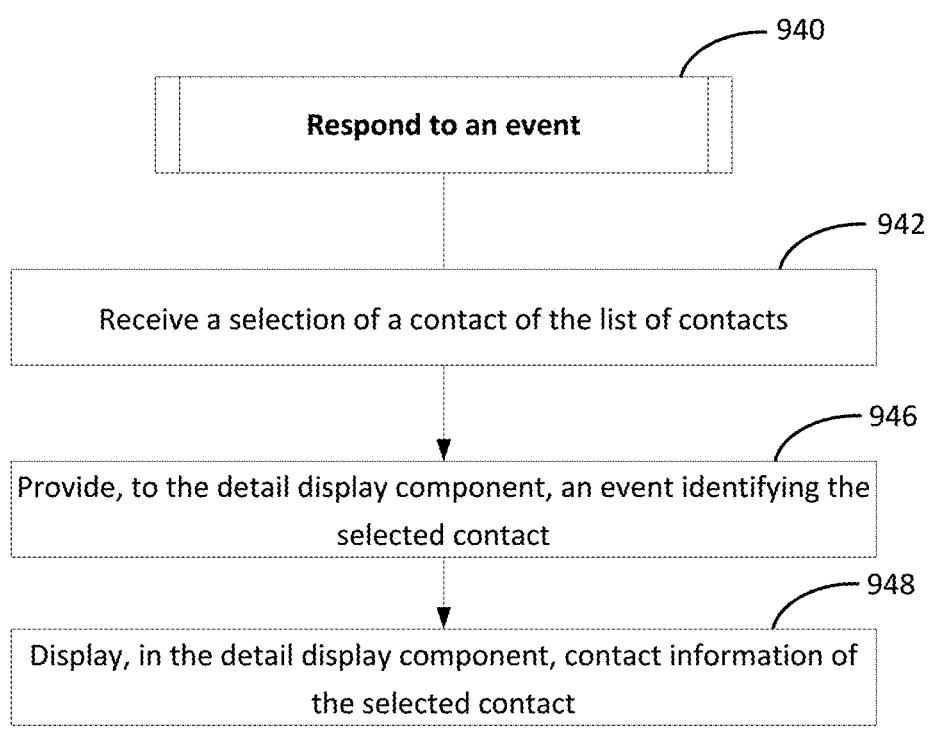

FIGS. 9A and 9B show flowcharts of examples of computer implemented methods 930 and 940 for responding to an event raised by a component of the web application, according to some implementations.

In FIG. 9A, at block 932, the embedded component may be an information feed of an on-demand database system, and the other components of the web application may be configured to raise events, which the embedded component recognizes and handles, identifying objects of the on-demand database system. In some implementations, the information feed may be an enterprise social network feed. The enterprise social network feed of the embedded component may be configured to respond to the events by displaying information updates for the identified objects in the enterprise social network feed. At block 932, the mobile device receives a selection, in one of the components of the web application, of an object of the on-demand database system.

As an example, the web application may be a corporation internal website, such as the Dell intranet, and the developer of the intranet may wish to include in the internal site a Salesforce Chatter® feed, and have the feed automatically follow any Salesforce-backed objects that an employee encounters as he is navigating the Dell intranet. Instead of developing a separate feed component for the intranet, the Salesforce Chatter® feed may already exist on the Salesforce servers as a self-contained, reusable component, built on the Salesforce UI framework, which the developer may embed in his web application. As the employee browses the intranet, he may select an account record for a particular Dell client to display in a component of the user interface.

In FIG. 9A, at block 934, the mobile device provides, to the embedded component, an event identifying the selected object. For example, when the Dell employee selects the account record to be displayed, an event is triggered and handled by the embedded component containing the Chatter® feed.

In FIG. 9A, at block 936, the mobile device displays in the feed one or more information updates associated with the selected object. Once the embedded component detects the event triggered by the selection of the account record, the feed may respond by searching the on-demand database system for updates pertaining to the selected account record. In this way, the feed may be context-sensitive, providing additional useful information for records that the employee may be examining as he navigates the Dell intranet.

Turning to FIG. 9B, the embedded component may be a detail display component for a contact record, and one of the other components may be a list of contacts. At block 942, the mobile device may receive a selection of one of the contacts in a list of contacts displayed in the other component.

Figure 10:
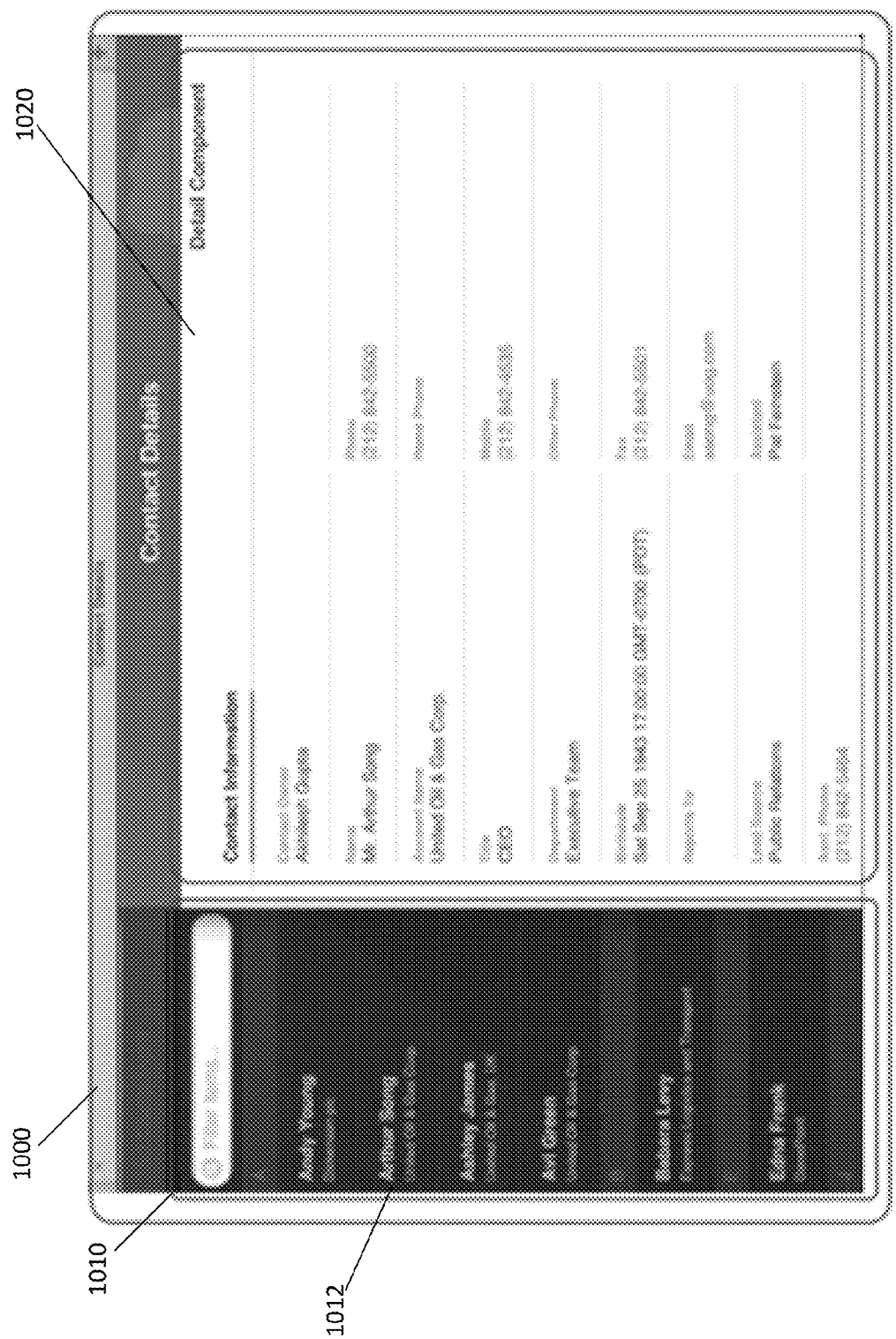
FIG. 10 shows an example of a GUI 1000 for an instance of a web application containing one or more components, according to some implementations.

FIG. 10 shows an example of a graphical user interface (GUI) 1000 for an instance of a web application containing one or more components, according to some implementations. The GUI 1000 includes a contact list component 1010 and a contact detail display component 1020. In this example, the contact list component 1010 is hosted on the server that this web application is hosted on. And the contact detail display component is hosted on a different component server and has been embedded into this web application. The user of the web application has selected "Arthur Song" 1012 from the contact list component 1010.

In FIG. 9B, at block 946, the mobile device raises an event identifying the selected contact. The embedded component includes an event handler that can handle this event. In the example of FIG. 10, when the user selects "Arthur Song" 1012 from the contact list component 1010, an event is triggered, which the contact list component 1010 detects and handles.

In FIG. 9B, at block 948, the mobile device displays, in the detail display component, information for the selected contact. In FIG. 10, Arthur Song's contact details are then displayed in the detail display component in response to the event raised when the contact was selected in the contact list.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples are often described herein with reference to an implementation in which an on-demand database service environment is implemented in a system having an application server providing a front end for an on-demand database service capable of supporting multiple tenants, the present implementations are not limited to multi-tenant databases nor deployment on application servers. Implementations may be practiced using other database architectures, i.e., ORACLE®, DB2® by IBM and the like without departing from the scope of the implementations claimed.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system for providing a user interface (UI) framework associated with a server system configured to host a web application, the system comprising:
    a UI framework comprising a set of reusable and extensible components, each component having an associated application programming interface (API) and an associated component version identifier indicating a current version of the component; and
    a server system comprising a plurality of servers, each server comprising at least one hardware processor, the server system configured to communicate with a client system comprising at least one hardware processor, the server system configured to cause:
        displaying, in a UI at the client system, an instance of a server-hosted web application comprising a subset of the set of components of the UI framework,
        sending definitions of the subset of components to the client system, the definitions configured to be cached locally at the client system, the cached definitions configured to be used to display the instance of the web application in the UI at the client system,
        responsive to a request by the web application, performing a server-side action,
        providing results of the server-side action to the client system, the results configured to be cached locally at the client system,
        providing further results of at least one further server-side action to the client system, the further results associated with at least one predicted request by a component of the web application, the predicted request generated using heuristics associating at least one cached action with at least one predicted action,
        responsive to a server-side action request by a component of the web application, identifying a locally cached response without a further request to the server system,
        responsive to an updated server-side action request for an updated response, determining that the updated response is different from the cached response, and updating the web application and the cached response with the updated response.

2. The system of claim 1, wherein a result of a server-side action is indexed by an identifier uniquely identifying the server-side action.

3. The system of claim 1, wherein the UI framework is configured to use a further API to manage simultaneous connections between components in the set of components.

4. The system of claim 1, wherein a predicted request is generated using relationships between customer relationship management (CRM) records stored in a database.

5. The system of claim 1, wherein a predicted action is based on at least one of: a user role, a user setting or a user behavior.

6. The system of claim 1, wherein a component is identified from other components according to at least one of: a role of a user, a position of the user or a personalization setting of the user.

7. The system of claim 1, wherein a request is an XMLHttpRequest request configured to trigger an action at a database system associated with the server system.

8. A computer program product comprising computer-readable program code capable of being executed by at least one processor when retrieved from a non-transitory computer-readable medium, the program code comprising instructions configured to cause:
    accessing a UI framework comprising a set of reusable and extensible components, each component having an associated application programming interface (API) and an associated component version identifier indicating a current version of the component;
    displaying, in a UI at a client system, an instance of a server-hosted web application comprising a subset of the set of components of the UI framework;
    sending definitions of the subset of components to the client system, the definitions configured to be cached locally at the client system, the cached definitions configured to be used to display the instance of the web application in the UI at the client system;
    responsive to a request by the web application, performing a server-side action;
    providing results of the server-side action to the client system, the results configured to be cached locally at the client system;
    providing further results of at least one further server-side action to the client system, the further results associated with at least one predicted request by a component of the web application, the predicted request generated using heuristics associating at least one cached action with at least one predicted action;
    responsive to a server-side action request by a component of the web application, identifying a locally cached response without a further request to a server system;
    responsive to an updated server-side action request for an updated response, determining that the updated response is different from the cached response; and
    updating the web application and the cached response with the updated response.

9. The computer program product of claim 8, wherein a result of a server-side action is indexed by an identifier uniquely identifying the server-side action.

10. The computer program product of claim 8, wherein the UI framework is configured to use a further API to manage simultaneous connections between components in the set of components.

11. The computer program product of claim 8, wherein a predicted request is generated using relationships between customer relationship management (CRM) records stored in a database.

12. The computer program product of claim 8, wherein a predicted action is based on at least one of: a user role, a user setting or a user behavior.

13. The computer program product of claim 8, wherein a component is identified from other components according to at least one of: a role of a user, a position of the user or a personalization setting of the user.

14. The computer program product of claim 8, wherein a request is an XMLHttpRequest request configured to trigger an action at a database system associated with the server system.

15. A method comprising:
- accessing a UI framework comprising a set of reusable and extensible components, each component having an associated application programming interface (API) and an associated component version identifier indicating a current version of the component;
- causing display, in a UI at a client system, of an instance of a server-hosted web application comprising a subset of the set of components of the UI framework;
- sending definitions of the subset of components to the client system, the definitions configured to be cached locally at the client system, the cached definitions configured to be used to display the instance of the web application in the UI at the client system;
- responsive to a request by the web application, performing a server-side action;
- providing results of the server-side action to the client system, the results configured to be cached locally at the client system;
- providing further results of at least one further server-side action to the client system, the further results associated with at least one predicted request by a component of the web application, the predicted request generated using heuristics associating at least one cached action with at least one predicted action;
- responsive to a server-side action request by a component of the web application, causing identification of a locally cached response without a further request to a server system;
- responsive to an updated server-side action request for an updated response, determining that the updated response is different from the cached response; and
- causing updating of the web application and the cached response with the updated response.

16. The method of claim 15, wherein a result of a server-side action is indexed by an identifier uniquely identifying the server-side action.

17. The method of claim 15, wherein the UI framework is configured to use a further API to manage simultaneous connections between components in the set of components.

18. The method of claim 15, wherein a predicted request is generated using relationships between customer relationship management (CRM) records stored in a database.

19. The method of claim 15, wherein a predicted action is based on at least one of: a user role, a user setting or a user behavior.

20. The method of claim 15, wherein a component is identified from other components according to at least one of: a role of a user, a position of the user or a personalization setting of the user.

* * * * *